US006942591B2

(12) United States Patent
Park

(10) Patent No.: US 6,942,591 B2
(45) Date of Patent: Sep. 13, 2005

(54) HYDRAULIC CONTROL SYSTEM OF A SIX-SPEED AUTOMATIC TRANSMISSION

(75) Inventor: Jin Mo Park, Gunpo (KR)

(73) Assignee: Hyundai Motor Company, Seoul (KR)

( * ) Notice: Subject to any disclaimer, the term of this patent is extended or adjusted under 35 U.S.C. 154(b) by 30 days.

(21) Appl. No.: 10/750,678

(22) Filed: Dec. 31, 2003

(65) Prior Publication Data

US 2005/0059522 A1 Mar. 17, 2005

(30) Foreign Application Priority Data

Sep. 16, 2003  (KR) ................................ 10-2003-0064078

(51) Int. Cl.[7] .............................................. F16H 31/00
(52) U.S. Cl. ...................... 475/127; 475/116; 475/118; 475/119; 475/120; 475/121; 477/127; 477/130; 477/159
(58) Field of Search ................................ 475/116, 118, 475/119, 120, 121, 127; 477/127, 130, 159, 906, 907

(56) References Cited

U.S. PATENT DOCUMENTS 6,027,427 A * 2/2000 Yoo ............................ 477/130
6,139,469 A * 10/2000 Jang ............................ 477/130
6,394,926 B1 * 5/2002 Jang ............................ 475/116
6,565,474 B2 * 5/2003 Futamura et al. ........... 475/128
6,805,649 B2 * 10/2004 Kim et al. ................... 475/128
2004/0248685 A1 * 12/2004 Yi ................................ 475/119

FOREIGN PATENT DOCUMENTS

| DE | 6971302 | 5/2003 | |
| JP | 02042270 A | * 2/1990 | ........... F16H/61/16 |
| JP | 2003-056683 | 2/2003 | |

* cited by examiner

Primary Examiner—Charles A. Marmor
Assistant Examiner—David D. Le
(74) Attorney, Agent, or Firm—Morgan Lewis & Bockius LLP

(57) ABSTRACT

Each control portion for controlling each friction element includes a switch valve and pressure control valve such that hydraulic pressure supplied to the friction element is fully controlled, and a control portion for controlling a friction element that is operated both at low and high speeds includes a switch valve that senses an operation of a friction member cooperatively with the friction element at the high speed such that the friction member receives different hydraulic pressure at low and high speeds. A plurality of fail-safe valves is included for enhancement of a fail-safe function of an automatic transmission.

19 Claims, 8 Drawing Sheets

FIG. 2

|    | C1 | C2 | C3 | B1 | B2 | OWC |
|----|----|----|----|----|----|-----|
| D1 | O  |    |    | E  |    | O   |
| D2 | O  |    |    |    | O  |     |
| D3 | O  | O  |    |    |    |     |
| D4 | O  |    | O  |    |    |     |
| D5 |    | O  | O  |    |    |     |
| D6 |    |    | O  |    | O  |     |
| R  |    | O  |    | O  |    |     |

E : Operated for an engine brake

HYDRAULIC CONTROL SYSTEM OF A SIX-SPEED AUTOMATIC TRANSMISSION

CROSS-REFERENCE TO RELATED APPLICATIONS

This application claims priority of Korean Application No. 10-2003-0064078, filed on Sep. 16, 2003, the disclosure of which is incorporated fully herein by reference.

FIELD OF THE INVENTION

Generally, the present invention relates to a hydraulic control system of an automatic transmission. More particularly the present invention relates to a hydraulic control system of an automatic transmission providing reduced shift-shock and enhanced fuel mileage.

BACKGROUND OF THE INVENTION

Typical automatic transmissions include a torque converter and a powertrain of a multiple speed gear mechanism connected to the torque converter. In addition, a hydraulic control system is provided at the automatic transmission for selectively operating at least one operational element included in the powertrain when the vehicle is running.

A variety of such powertrains and hydraulic control systems have been developed by vehicle manufactures according to their own schemes. Currently, four-speed automatic transmissions are most often found in the market. However, a five-speed automatic transmission is also available for the power transmission performance enhancement and for enhanced fuel mileage of a vehicle.

Building on such five-speed automatic transmissions, six-speed automatic transmissions are currently under investigation to further enhance the performance of a power transmission of an automatic transmission, and, thereby increase fuel mileage of the vehicle.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The motivation for the present invention is to provide a hydraulic control system of a six-speed automatic transmission for a vehicle having non-limiting advantages of enhanced control precision, reduced shift-shock, and enhanced fuel mileage.

An exemplary hydraulic control system of a six-speed automatic transmission for a vehicle according to an embodiment of the present invention includes: A line pressure control portion; a launch control portion; a pressure reduction control portion; a switch valve control portion; a first clutch control portion; a B1/C3 portion; a second clutch control portion; and a B2 control portion.

The line pressure control portion stably maintains hydraulic pressure supplied from an oil pump and varies a line pressure according to driving conditions. The launch control portion controls a torque increase of a torque converter and controls a damper clutch. The pressure reduction control portion reduces line pressure and for outputting the reduced line pressure as control pressure. The switch valve control portion includes a manual valve for changing hydraulic lines according to a manual operation, a first switch valve controlled by the line pressure and a first on/off solenoid valve, a second switch valve controlled by the line pressure and a second on/off solenoid valve, and third and fourth switch valves controlled by the line pressure and control pressure from the second switch valve.

The first clutch control portion includes a first clutch side switch valve and a first clutch side pressure control valve that are controlled by a first duty control solenoid valve, such that the first clutch control portion controls an operating pressure of the first clutch. The B1/C3 control portion includes a third clutch side switch valve and a third clutch side pressure control valve that are controlled by a second duty control solenoid valve, a control valve for switching a hydraulic line for hydraulic pressure supplied from the third clutch side pressure control valve, and a first brake side fail-safe valve for supplying hydraulic pressure received from the control valve to the first brake and for executing a fail-safe function.

The second clutch control portion includes a second clutch side switch valve and a second clutch side pressure control valve that are controlled by a third duty control solenoid valve, and a second clutch side fail-safe valve for transmitting hydraulic pressure received from the second clutch side pressure control valve to the second clutch and for executing a fail-safe function. The B2 control portion includes a second brake side switch valve and a second brake side pressure control valve that are controlled by a fourth duty control solenoid valve, a sixth-speed-related switch valve for supplying, under the control of the operating pressure of the third clutch, hydraulic pressure received from the fourth duty control solenoid valve to the second brake side pressure control valve as a control pressure, and a second brake side fail-safe valve for transmitting hydraulic pressure received from the second brake side pressure control valve to the second brake and for executing a fail-safe function.

In a further embodiment, the manual valve includes a line pressure line, a reverse speed pressure line, and a forward speed pressure line. The line pressure line is connected to a regulator valve. The reverse speed pressure line supplies a reverse speed pressure in a reverse speed. The forward speed pressure line supplies a forward speed pressure in forward speeds.

In another further embodiment, the first switch valve includes a valve body and a valve spool. The valve body of the first switch valve includes a first port, a second port, a third port, and fourth and fifth ports. The first port receives a control pressure from the first on/off solenoid valve. The second port is disposed opposite to the first port, for receiving the line pressure as a control pressure. The third port receives the line pressure. The fourth and fifth ports are disposed with a predetermined spacing, for supplying hydraulic pressure received through the first port selectively to two ports of the second switch valve.

The valve spool of the first switch valve includes a first land, a second land, a third land, and a fourth land. The first land receives a control pressure through the first port. The second land selectively communicates the fifth port with an exhaust port. The third land cooperates with the second land for selectively communicating the third port with the fifth port cooperatively with the second land. The a fourth land receives a control pressure through the second port, for selectively communicating the third port with the fourth port cooperatively with the third land, and for selectively communicating the fourth port with an exhaust port.

In a yet another further embodiment, the second switch valve includes a valve body and a valve spool. The valve body of the second switch valve includes a first port, a second port, a third port, a fourth port, a fifth port, a sixth port, and a seventh port. The first port receives a control pressure from the second on/off solenoid valve. The second port is disposed opposite to the first port, for receiving the line pressure as a control pressure. The third port receives hydraulic pressure from the fourth port of the first switch valve. The fourth port receives hydraulic pressure from the fifth port of the first switch valve. The fifth port supplies hydraulic pressure of the third port to the control valve as a control pressure. The sixth port supplies hydraulic pressure of the third port to the third switch valve as a control pressure. The seventh port supplies hydraulic pressure of the fourth port to the fourth switch valve as a control pressure.

The valve spool of the second switch valve includes a first land, a second land, a third land, a fourth land, and a fifth land. The first land receives a control pressure through the first port. The second land selectively communicates the fifth port with an exhaust port. The third land selectively communicates the third port with the fifth and sixth ports a fourth land cooperating with the third land for selectively communicating the sixth port with an exhaust port. The fifth land cooperates with the fourth land for selectively communicating the fourth port with the seventh port.

In a yet another further embodiment, the third switch valve includes a valve body and a valve spool. The valve body of the third switch valve includes a first port, a second port, a third port, a fourth port, a fifth port, a sixth port, and a seventh port. The first port receives the line pressure as a control pressure. The second port is disposed opposite to the first port, for receiving a control pressure from the second switch valve. The third port is disposed adjacent to the second port, for receiving an operating pressure of the first clutch as a control pressure. The fourth port is disposed adjacent to the third port, for receiving an operating pressure of the third clutch as a control pressure. The fifth port receives the line pressure as a source pressure. The sixth port selectively supplies hydraulic pressure of the fifth port to the second clutch side pressure control valve. The seventh port exhausts hydraulic pressure that has been output through the sixth port.

The valve spool of the third switch valve includes a first land, a second land, a third land, a fourth land, and a fifth land. The first land receives control pressure through the first port. The second land selectively communicates the sixth port with the seventh port. The third land selectively communicates the fifth port with the sixth port. The fourth land receives a control pressure through the fourth port. The fifth land receives a control pressure through the third port. An elastic member is disposed to a side of the fifth land.

In a yet another further embodiment, the fourth switch valve includes a valve body and a valve spool. The valve body of the fourth switch valve includes a first port, a second port, a third port, a fourth port, a fifth port, a sixth port, and a seventh port. The first port receives the line pressure as a control pressure. The second port is disposed opposite to the first port, for receiving a control pressure from the second switch valve. The third port is disposed adjacent to the second port, for receiving an operating pressure of the first clutch as a control pressure. The fourth port is disposed adjacent to the third port, for receiving an operating pressure of the third clutch as a control pressure. The fifth port receives the line pressure as a source pressure. The sixth port selectively supplies hydraulic pressure of the fifth port to the second brake side pressure control valve. The seventh port exhausts hydraulic pressure that has been output through the sixth port.

The valve spool of the fourth switch valve includes a first land, a second land, a third land, a fourth land, and a fifth land. The first land receives a control pressure through the first port. A second land selectively communicates the sixth port with the seventh port. A third land selectively communicates the fifth port with the sixth port. A fourth land receives a control pressure through the fourth port. A fifth land receives a control pressure through the third port. An elastic member is disposed to a side of the fifth land.

In a yet another further embodiment, the first clutch side switch valve includes a valve body and a valve spool. The valve body of the first clutch side switch valve includes a first port, a second port, a third port, and a fourth port. The first port receives a control pressure from the first duty control solenoid valve. The second port is disposed opposite to the first port, for receiving the reduced pressure of the reducing valve as control pressure. A third port receives the line pressure as a source pressure. A fourth port supplies hydraulic pressure of the third port to the first clutch side pressure control valve.

The valve spool of the first clutch side switch valve includes a first land and a second land. The first land receives a control pressure through the first port. The second land receives a control pressure through the second port and for selectively communicating the third port with the fourth port cooperatively with the first land. An elastic member is disposed to a side of the first land.

In yet another further embodiment, the first clutch side pressure control valve includes a valve body, a valve spool disposed therein, and a cup for safely maintaining a moved position of the valve spool. The valve body of the first clutch side pressure control valve includes a first port, a second port, a third port, a fourth port, a fifth port, and a sixth port. The first port receives a control pressure from the first clutch side switch valve. The second port receives a control pressure from the first duty control solenoid valve. The third port receives a reduced pressure of the reducing valve as a control pressure. The fourth port receives a forward speed pressure from the manual valve. The fifth port supplies hydraulic pressure of the fourth port to the first clutch. The sixth port exhausts hydraulic pressure that has been output through the fifth port. The valve spool of the first clutch side pressure control valve includes a first land and a second land.

The first land receives a control pressure fed through the second port and for selectively opening the sixth port. The second land receives a control pressure through the third port and for selectively communicating the fourth port with the fifth port cooperatively with the first land. The valve spool is disposed in the valve body interposing an elastic member and the cup for receiving control pressure fed through the first port.

In a yet another further embodiment, the third clutch side switch valve includes a valve body and a valve spool. The valve body of the third clutch side switch valve includes a first port, a second port, a third port, a fourth port, a fifth port, and a sixth port. The first port receives a control pressure from the second duty control solenoid valve. The second port is disposed opposite to the first port, for receiving the reduced pressure of the reducing valve as a control pressure. The third port receives the line pressure as a source pressure. The fourth port supplies hydraulic pressure of the third port to the third clutch side pressure control valve.

The valve spool of the third clutch side switch valve includes as first land and a second land. The first land receives a control pressure through the first port. The second land receives a control pressure through the second port and for selectively communicating the third port with the fourth port cooperatively with the first land. An elastic member is disposed to a side of the first land.

In a yet another further embodiment, the third clutch side pressure control valve includes a valve body, a valve spool disposed therein, and a floating member for safely maintaining a moved position of the valve spool. The valve body of the third clutch side pressure control valve includes a first port, a second port, a third port, a fourth port, a fifth port, and a sixth port.

The first port receives a control pressure from the third clutch side switch valve. The second port receives a control pressure from the second duty control solenoid valve; The third port receives a reduced pressure of the reducing valve as a control pressure. The fourth port receives a forward speed pressure from the manual valve. The fifth port supplies a hydraulic pressure of the fourth port to the control valve. The sixth port exhausts hydraulic pressure that has been output through the fifth port.

The valve spool of the third clutch side pressure control valve includes a first land, a second land, and a third land. The first land receives control pressure fed through the second port and for selectively opening the sixth port. The second land receives a control pressure through the third port and for selectively communicating the fourth port with the fifth port cooperatively with the first land. The third land receives control pressure fed through the third port. The valve spool is disposed in the valve body interposing an elastic member and the floating member for receiving control pressure fed through the first port.

In a yet another further embodiment, the control valve includes a valve body and a valve spool. The valve body of the control valve includes a first port, a second port, a third port, a fourth port, a fifth port, a sixth port, a seventh port, and an eighth port. The first port receives the line pressure as a control pressure. The second port is disposed opposite to the first port, for receiving a control pressure from the second switch valve. The third port receives an operating pressure of the first clutch as a control pressure. The fourth port receives an operating pressure of the third clutch side pressure control valve. The fifth port selectively supplies hydraulic pressure fed through the fourth port to the third clutch. The sixth port is disposed between the first port and the fourth port, for selectively exhausting hydraulic pressure that has been output through the fifth port. The seventh port is disposed between the third port and fifth port and connected to the first brake side switch valve. The eighth port exhausts hydraulic pressure that has been exhausted from the seventh port, and The valve spool of the control valve includes a first land, a second land, a third land, a fourth land and a fifth land. The first land receives a control pressure through the first port, and for selectively opening the sixth port. The second land selectively communicates the fourth port with the fifth port. The third land selectively communicates the seventh port with the eighth port. The fourth land receives a control pressure through the third port. The fifth land receives a control pressure through the second port.

In a yet another further embodiment, the first brake side fail-safe valve includes a valve body and a valve spool. The valve body of the first brake side fail-safe valve includes a first port, a second port, a third port, a fourth port, a fifth port, a sixth port, a seventh port and an eighth port. The first port receives the line pressure as a control pressure. The second port communicates with the seventh port of the control valve. The third port supplies hydraulic pressure fed through the second port to the first brake. The fourth port exhausts hydraulic pressure exhausted from the third port. The fifth port receives operating pressure of the second brake as a control pressure. The sixth port receives operating pressure of the second clutch as a control pressure. The seventh port receives operating pressure of the first clutch as a control pressure. The eighth port receives reverse speed pressure as a control pressure.

The valve spool of the first brake side fail-safe valve includes a first land, a second land, a third land, a fourth land, a fifth land, a sixth land, and a seventh land. The first land receives a control pressure through the first port. The second land is adjacent to the first land. The third land selectively communicates the third port with the second and fourth ports. The fourth land receives control pressure though the fifth port, and cooperates with the third land, for selectively communicating the third port with the fourth port. The fifth land receives control pressure through the sixth port. The sixth land receives control pressure through the seventh port. The seventh land receives control pressure through the eighth port.

In a yet another further embodiment, the second clutch side switch valve includes a valve body and a valve spool. The valve body of the second clutch side switch valve includes a first port, a second port, a third port, and a fourth port.: The first port receives a control pressure from the third duty control solenoid valve. The second port is disposed opposite to the first port, for receiving the reduced pressure of the reducing valve as a control pressure. The third port receives the line pressure as a source pressure. The fourth port supplies hydraulic pressure of the third port to the second clutch side pressure control valve. The valve spool of the second clutch side switch valve includes a first land and a second land. The first land receives a control pressure through the first port. The second land receives a control pressure through the second port and for selectively communicating the third port with the fourth port cooperatively with the first land. An elastic member is disposed to a side of the first land.

In yet another further embodiment, the second clutch side pressure control valve includes a valve body, a valve spool disposed therein, and a floating member for safely maintaining a moved position of the valve spool. The valve body of the second clutch side pressure control valve includes a first port, a second port, a third port, a fourth port, a fifth port, a sixth port. The first port receives a control pressure from the second clutch side switch valve. The second port receives a control pressure from the third duty control solenoid valve. The third port receives a reduced pressure of the reducing valve as a control pressure. The fourth port receives a hydraulic pressure from the third switch valve. The fifth port supplies hydraulic pressure of the fourth port to the second clutch fail-safe valve. The sixth port exhausts hydraulic pressure that has been output through the fifth port. The valve spool of the second clutch side pressure control valve includes a first land and a second land. The first land receives control pressure fed through the second port and for selectively opening the sixth port.

The second land receives a control pressure through the third port and for selectively communicating the fourth port with the fifth port cooperatively with the first land. The third land receives control pressure fed through the third port. The valve spool is disposed in the valve body interposing an elastic member and the floating member for receiving control pressure fed through the first port.

In yet another further embodiment, the second clutch side fail-safe valve includes a valve body and a valve spool. The valve body of the second clutch side fail-safe valve includes a first port, a second port, a third port, a fourth port, a fifth port, and a sixth port. The first port receives the line pressure as a control pressure. The second port communicates with the fifth port of the second clutch side pressure control valve. The third port supplies hydraulic pressure fed through the second port to the second clutch. The fourth port exhausts hydraulic pressure exhausted from the third port. The fifth port receives operating pressure of the third clutch as a control pressure. The sixth port receives operating pressure of the first clutch as a control pressure.

The valve spool of the second clutch side fail-safe valve includes a first land, a second land, a third land, a fourth land, a fifth land, and a sixth land. The first land receives a control pressure through the first port. The second land is adjacent to the first land. The third land selectively communicates the third port with the second and fourth ports. The fourth land receives control pressure though the fifth port, and cooperates with the third land, for selectively communicating the third port with the fourth port. The fifth land receives control pressure through the sixth port. The sixth land receives control pressure through the sixth port together with the fifth land.

In a yet another further embodiment, the second brake side switch valve includes a valve body and a valve spool. The valve body of the second clutch side switch valve includes a first port, a second port, a third port, and a fourth port. The first port receives a control pressure from the fourth duty control solenoid valve. The second port is disposed opposite to the first port, for receiving the reduced pressure of the reducing valve as a control pressure. The third port receives the line pressure as a source pressure. The fourth port supplies hydraulic pressure of the third port to the second brake side pressure control valve. The valve spool of the second brake side switch valve includes a first and second land. The first land receives a control pressure through the first port. The second land receives a control pressure through the second port and for selectively communicating the third port with the fourth port cooperatively with the first land. An elastic member is disposed to a side of the first land.

In yet another further embodiment, the second brake side control valve includes a valve body, a valve spool disposed therein, and a floating member for safely maintaining a moved position of the valve spool. The valve body of the second brake side pressure control valve includes a first port, a second port, a third port, a fourth port, a fifth port, a sixth port, and a seventh port. The first port receives a control pressure from the second brake side switch valve. The second port receives a control pressure from the fourth duty control solenoid valve. The third port receives a reduced pressure of the reducing valve as a control pressure. The fourth port receives a hydraulic pressure from the fourth switch valve. The fifth port supplies hydraulic pressure of the fourth port to the second brake side fail-safe valve. The sixth port exhausts hydraulic pressure that has been output through the fifth port. The seventh port receives control pressure from the sixth-speed-related switch valve.

The valve spool of the second brake side pressure control valve includes a first land, a second land, a third land, and a fourth land. The first land receives control pressure fed through the second port and for selectively opening the sixth port. The second land receives a control pressure through the third port and for selectively communicating the fourth port with the fifth port cooperatively with the first land. The third land receives control pressure fed through the third port. The fourth land receives control pressure from the sixth-speed-related switch valve. The valve spool is disposed in the valve body interposing an elastic member and the floating member for receiving control pressure fed through the first port.

In yet another further embodiment, the sixth-speed-related switch valve includes a valve body and a valve spool. The valve body of the sixth-speed-related switch valve includes a first port, a second port, a third port, a fourth port, a fifth port, and a sixth port. The first port receives the operating pressure of the third clutch as a control pressure. The second port receives a control pressure controlled by the fourth duty control solenoid valve. The third port supplies hydraulic pressure fed through the second port to the second brake side pressure control valve as a control pressure thereof. The valve spool of the sixth-speed-related switch valve includes a first land and a second land. The first land receives a control pressure through the first port. The second land selectively communicates the second port with the third port. An elastic member is disposed to a side of the second land.

In yet another further embodiment, the second brake side fail-safe valve includes a valve body and a valve spool. The valve body of the second brake side fail-safe valve includes a first port, a second port, a third port, a fourth port, a fifth port, a sixth port, a seventh port, and an eighth port. The first port receives the line pressure as a control pressure. The second port communicates with the fifth port of the second brake side pressure control valve. The third port supplies hydraulic pressure fed through the second port to the second brake. The fourth port exhausts hydraulic pressure exhausted from the third port. The fifth port receives operating pressure of the second brake as a control pressure. The sixth port receives operating pressure of the third clutch as a control pressure. The seventh port receives operating pressure of the first clutch as a control pressure. The eighth port receives operating pressure of the first brake as a control pressure.

The valve spool of the second brake side fail-safe valve includes a first land, a second land, a third land, a fourth land, a fifth land, a sixth land, and a seventh land. The first land receives a control pressure through the first port. The second land is adjacent to the first land. The third land selectively communicates the third port with the second and fourth ports. The fourth land receives control pressure though the fifth port and for selectively communicating the third port with the fourth port cooperatively with the third land. The fifth land receives control pressure through the sixth port. The sixth land receives control pressure through the seventh port. The seventh land receives control pressure through the eighth port.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 2 is an operational chart for the powertrain of FIG. 1;

DETAILED DESCRIPTION OF THE PREFERRED EMBODIMENTS

Embodiments of the present invention will hereinafter be described in detail with reference to the accompanying drawings.

Figure 1:
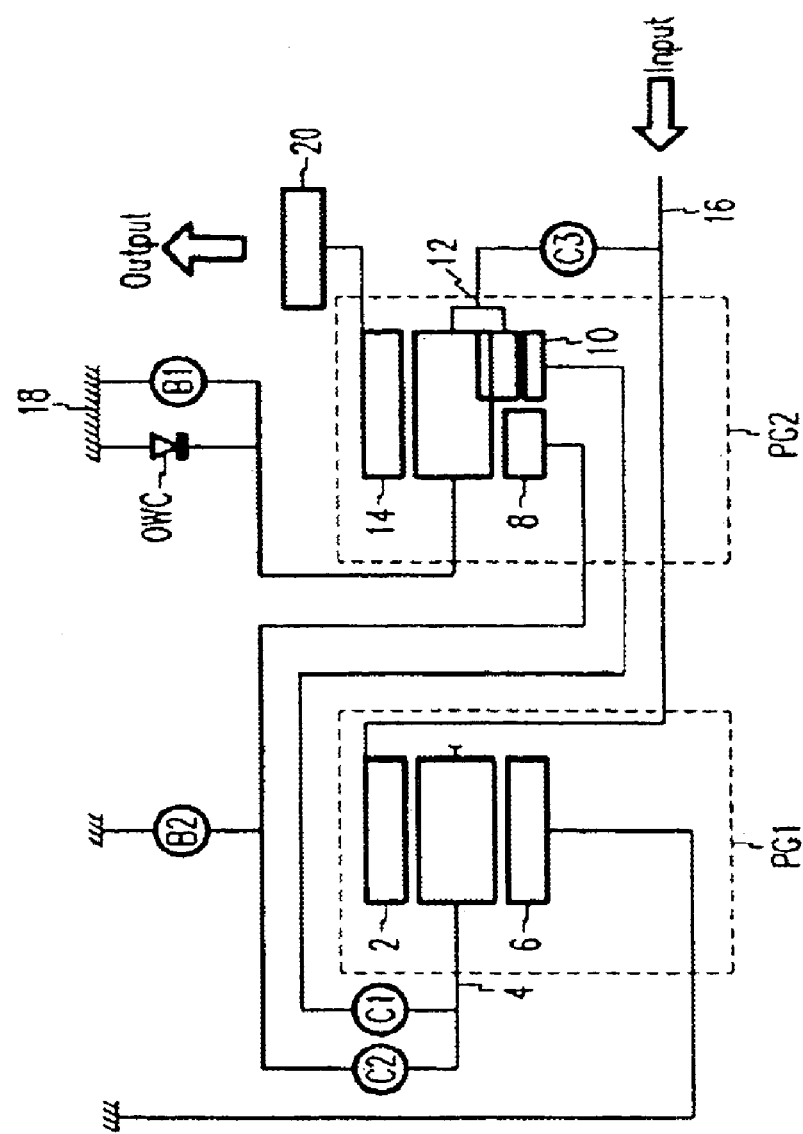
FIG. 1 is a schematic diagram of an exemplary powertrain operable by a hydraulic control system according to an embodiment of the present invention.

FIG. 1 is a schematic diagram of an exemplary powertrain operable by a hydraulic control system according to an embodiment of the present invention. The exemplary powertrain includes a first planetary gear set PG1 of a single pinion planetary gear set style and second planetary gear set PG2 of a Lavingneaux type planetary gear set style. The second planetary gear set PG2 is disposed on one side of the engine, and the first planetary gear set PG1 is disposed behind it. A ring gear of the first planetary gear set PG1 is hereinafter denoted as a first ring gear 2, a pinion carrier thereof as a first pinion carrier 4, and a sun gear thereof as a first sun gear 6.

A sun gear of the second planetary gear set PG2 is engaged with a long pinion and is hereinafter denoted as a second sun gear 8. A sun gear of the second planetary gear set PG2 is engaged with a short pinion as a third sun gear 10. A pinion carrier of the second planetary gear set PG2 holds the long and short pinions as a third pinion carrier 12. A ring gear of the second planetary gear set PG2 is hereafter deemed as a third ring gear 14. In the configuration shown in FIG. 1, the first ring gear 2 is fixedly connected to an input shaft 16 connected to an output side of an engine interposing a torque converter (not shown). This causes the first ring gear 2 to always act as an input element. The first pinion carrier 4 is variably connected to the third sun gear 10 through a first clutch C1, and at the same time, variably connected to the second sun gear 8 through a second clutch C2. The first sun gear 6 is fixedly connected to a transmission housing 18, so it always acts as a fixed element.

The third pinion carrier 12 is variably connected to the input shaft 16 through a third clutch C3, and at the same time, variably connected to the transmission housing 18 interposing a first brake B1 and a one way clutch OWC in a parallel fashion. The third ring gear 14 is connected to an output gear 20 which is connected to a differential apparatus. A connecting member interconnecting the second clutch C2 and the second sun gear 8 is connected to the transmission housing 18 interposing a second brake B2, so the second sun gear 8 selectively acts as a fixed element.

Figure 3:
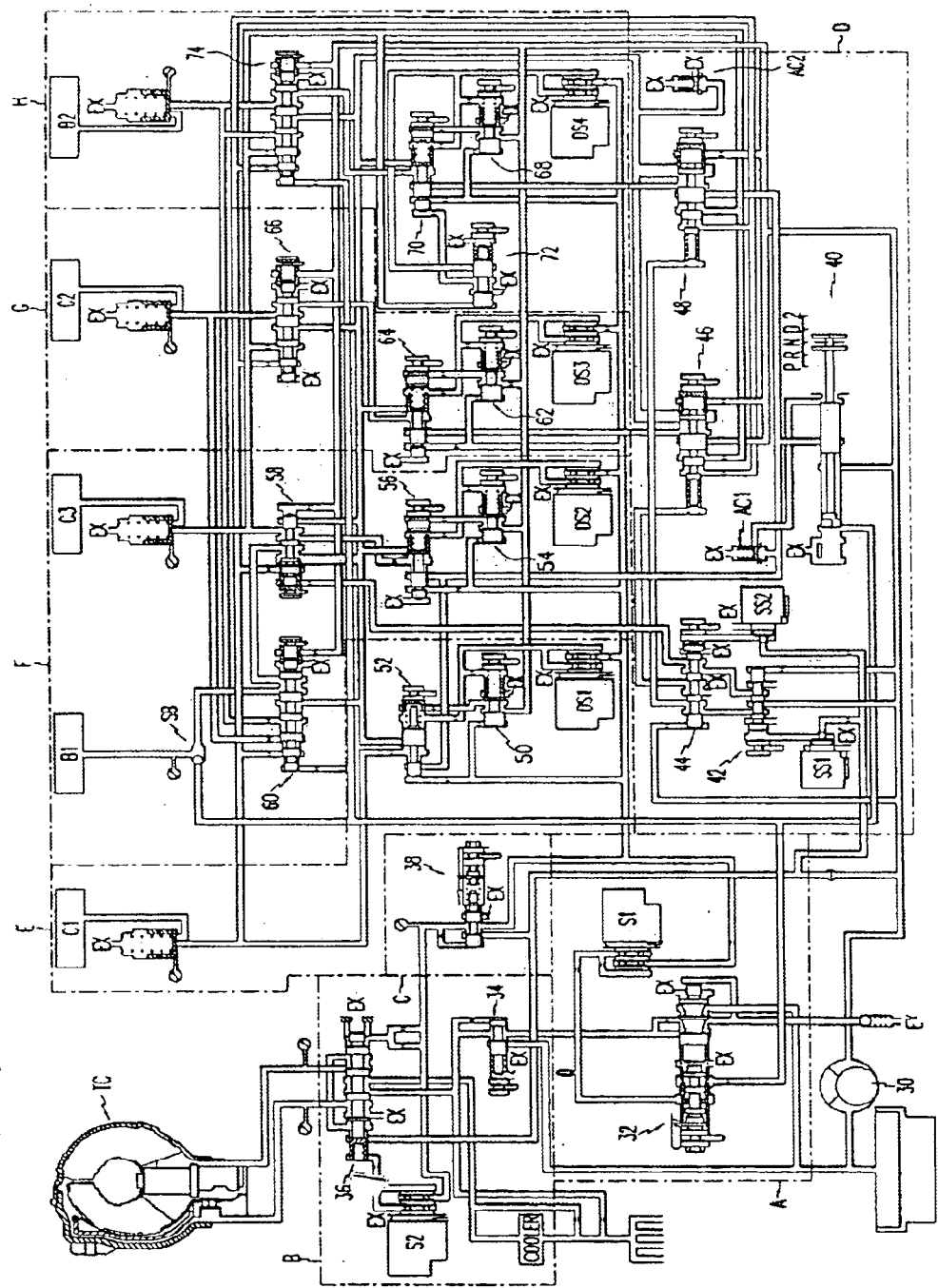
FIG. 3 is a schematic diagram of a hydraulic control system according to an embodiment of the present invention.

The above described powertrain realizes six forward speeds and a reverse speed by operating, as shown in FIG. 3. In other words, the first clutch C1 for a forward first speed, the first clutch C1 and second brake B2 for a forward second speed, the first and second clutches C1 and C2 for a forward third speed, the first and third clutches C1 and C3 for a forward fourth speed, the second and third clutches C2 and C3 for a forward fifth speed, the third clutch C3 and second brake B2 for a forward sixth speed, and the second clutch C2 and first brake B1 for a reverse speed. If an engine brake is required, such as in an L range, the first brake B1 is operated. Shifting operations of the powertrain shown in FIG. 1 according to an operational chart shown in FIG. 2 are obvious to a person of ordinary skill in the art. An exemplary hydraulic control system for operating such a powertrain described above is hereinafter described in detail.

As shown in FIG. 3, a hydraulic control system according to an embodiment of the present invention includes: a line pressure control portion A; a launch control portion B; a pressure reduction control portion C; a switch valve control portion D; a first clutch control portion E for controlling the first clutch C1; a B1/C3 control portion F for controlling the first brake B1 and third clutch C3; a second clutch control portion G for controlling the second clutch C2; and a B2 control portion H for controlling the second brake B2, such that hydraulic pressure supply/release to each of the friction members C1, C2, C3, B1, and B2 is controlled. The line pressure control portion A, the launch control portion B, and the pressure reduction control portion C is realized similar to as known in the art.

The line pressure control portion A includes a regulator valve 32 and a solenoid valve S1 (linearly controlled) for controlling the regulator valve 32. Therefore, the line pressure control portion A stably maintains hydraulic pressure supplied from the oil pump 30 at a predetermined level and varies a line pressure according to driving conditions, to increase fuel mileage.

The launch control portion B includes a torque converter control valve 34 for reducing line pressure, a damper clutch control valve 36 for controlling engagement and disengagement of a damper clutch, and a solenoid valve S2 (duty controlled) for controlling the damper clutch control valve 36 according to an electrical signal from a transmission control unit (TCU). Accordingly, a torque increase of a torque converter can be achieved for acceleration, and the damper clutch can be controlled to operate at a high vehicle speed.

The pressure reduction control portion C includes a reducing valve 38. The reducing valve 38 reduces hydraulic pressure supplied from the oil pump 30 and supplies the reduced hydraulic pressure to the solenoid valves S1 and S2 as their control pressures. At the same time, the reducing valve 38 supplies the reduced hydraulic pressure to control portions described later for controlling clutches and brakes of the powertrain.

The switch valve control portion D includes: a manual valve 40 for changing hydraulic lines according to a manual operation; a first switch valve 42 controlled by the line pressure and a first on/off solenoid valve SS1; a second switch valve 44 controlled by the line pressure and a second on/off solenoid valve SS2; and third and fourth switch valves 46 and 48 controlled by the line pressure and control pressure from the second switch valve 44.

The first clutch control portion E includes a first clutch side switch valve 50 and a first clutch side pressure control valve 52 that are controlled by a first duty control solenoid valve DS1. The first clutch control portion E controls an operating pressure of the first clutch C1.

The B1/C3 control portion F includes a third clutch side switch valve 54 and a third clutch side pressure control valve 56 that are controlled by a second duty control solenoid valve DS2, a control valve 58 for switching a hydraulic line for hydraulic pressure supplied from the third clutch side pressure control valve 56, and a first brake side fail-safe valve 60 for supplying hydraulic pressure received from the control valve 58 to the first brake B1 and for executing a fail-safe function.

The second clutch control portion G controls an operating pressure of the second clutch C2. The second clutch control portion G includes a second clutch side switch valve 62 and a second clutch side pressure control valve 64 that are controlled by a third duty control solenoid valve DS3, and a second clutch side fail-safe valve 66 for transmitting hydraulic pressure received from the second clutch side pressure control valve 64 to the second clutch C2 and for executing a fail-safe function.

The B2 control portion H controls an operating pressure of the second brake B2. The B2 control portion H includes: a second brake side switch valve 68 and a second brake side pressure control valve 70 that are controlled by a fourth duty control solenoid valve DS4; a sixth-speed-related switch valve 72 for supplying, under the control of the operating pressure of the third clutch C3, hydraulic pressure received from the fourth duty control solenoid valve DS4 to the second brake side pressure control valve 70 as a control pressure; and a second brake side fail-safe valve 74 for transmitting hydraulic pressure received from the second brake side pressure control valve 70 to the second brake B2 and for executing a fail-safe function. Such a hydraulic control system is hereinafter described in further detail.

Figure 4:
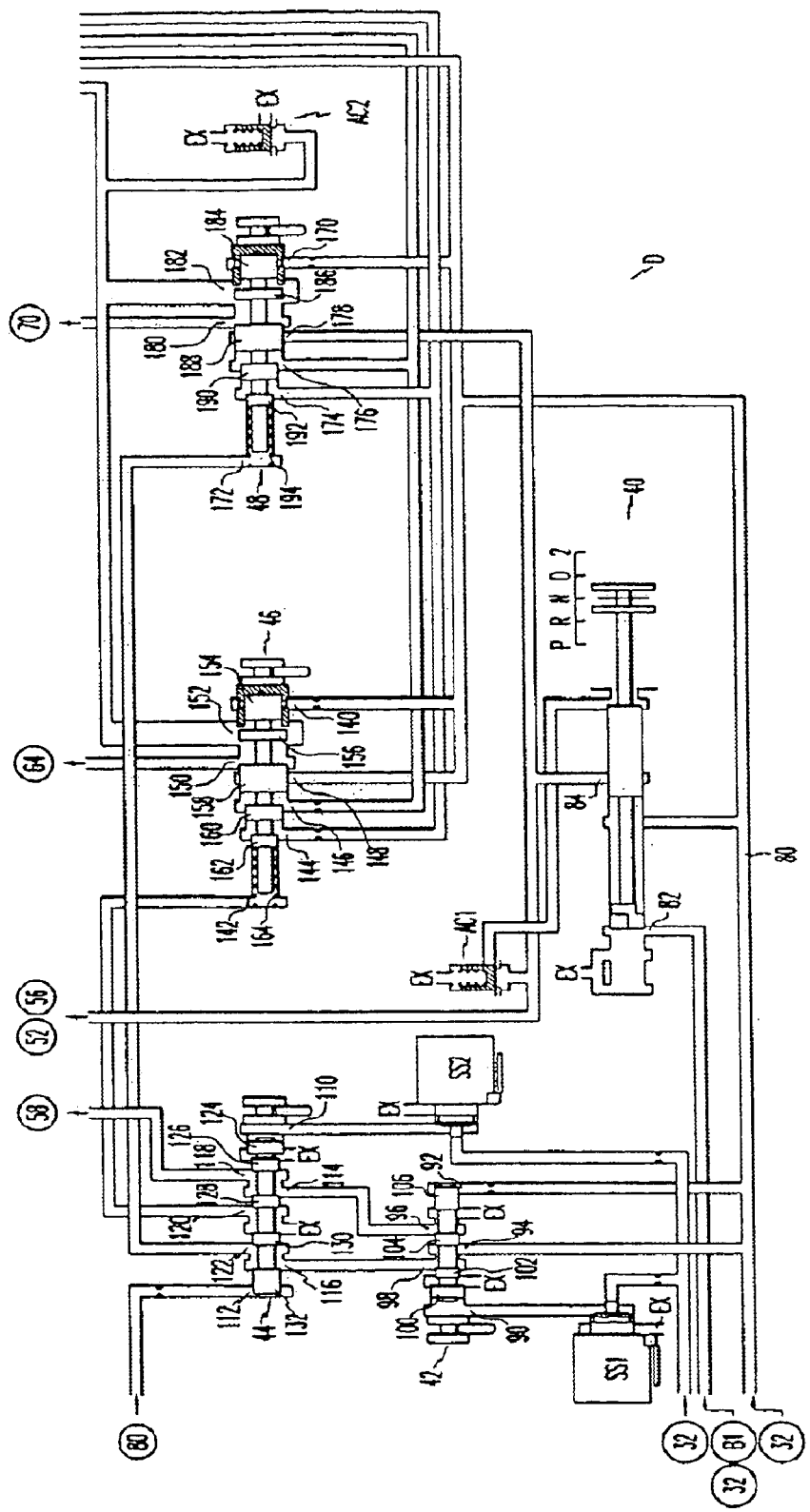
FIG. 4 is an enlarged view of a switch valve control portion in a hydraulic control system according to an embodiment of the present invention.

As shown in FIG. 4, the manual valve 40 selectively supplies hydraulic pressure received from a line pressure line 80, which is connected to the reducing valve 38, to a reverse speed pressure line 82 and a forward speed pressure line 84 according to a range shift thereof.

The reverse speed pressure line 82 is connected to the first brake B1 and is also connected to the regulator valve 32, such that hydraulic pressure in the line 82 can be controlled in an R range. In addition, the reverse speed pressure line 82 is connected to the first brake side fail-safe valve 60 and the second brake side fail-safe valve 74, such that hydraulic pressure is supplied thereto as their control pressures (refer to FIG. 3). The forward speed pressure line 84 is connected to control portions for controlling friction members so as to supply operating pressure. The first switch valve 42 includes a valve body and a valve spool disposed therein. The valve body of the first switch valve 42 includes: a first port 90 for receiving a control pressure from the first on/off solenoid valve SS1; a second port 92 disposed opposite to the first port 90 for receiving the line pressure as a control pressure; a third port 94 for receiving the line pressure; and fourth and fifth ports 96 and 98 disposed with a predetermined spacing for selectively supplying hydraulic pressure received through the third port 94 to ports 114 and 116 of the second switch valve 44.

The valve spool of the first switch valve 42 includes: a first land 100 for receiving a control pressure through the first port 90; a second land 102 for selectively communicating the fifth port 98 with an exhaust port EX; a third land 104 cooperating with the second land 102 for selectively communicating the third port 94 with the fifth port 98; and a fourth land 106 for receiving a control pressure through the second port 92 and for selectively communicating the third port 94 with the fourth port 96 cooperatively with the third land 104 and for selectively communicating the fourth port 96 with an exhaust port EX. The radius of the first land 100 is smaller than the radius of the fourth land 106.

When the first on/off solenoid valve SS1 is turned off, the valve spool is biased to the left in FIG. 4 by a control pressure fed through the second port 92, and accordingly the third port 94 communicates with the fourth port 96.

Conversely, when the first on/off solenoid valve SS1 is turned on, the valve spool is biased to the right as shown in FIG. 4, and accordingly the third port 94 communicates with the fifth port 98.

The second switch valve 44 includes a valve body and a valve spool disposed therein. The valve body of the second switch valve 44 includes: a first port 110 for receiving a control pressure from the second on/off solenoid valve SS2; a second port 112 disposed opposite to the first port 110 for receiving the line pressure as a control pressure; a third port 114 for receiving hydraulic pressure from the fourth port 96 of the first switch valve 42; a fourth port 116 for receiving hydraulic pressure from the fifth port 98 of the first switch valve 42; a fifth port 118 for supplying hydraulic pressure of the third port 114 to the control valve 58 as a control pressure; a sixth port 120 for supplying hydraulic pressure of the third port 114 to the third switch valve 46 as a control pressure; and a seventh port 122 for supplying hydraulic pressure of the fourth port 116 to the fourth switch valve 48 as a control pressure.

The valve spool of the second switch valve 44 includes a first land 124 for receiving a control pressure through the first port 110; a second land 126 for selectively communicating the fifth port 118 with an exhaust port EX; a third land 128 for selectively communicating the third port 114 with the fifth and sixth ports 118 and 120; a fourth land 130 cooperating with the third land 128 for selectively communicating the sixth port 120 with an exhaust port EX; and a fifth land 132 cooperating with the fourth land 130 for selectively communicating the fourth port 116 with the seventh port 122.

The fifth land 132 receives a control pressure of the second port 112, and its radius is smaller than that of the first land 124. When the second on/off solenoid valve SS2 is turned off, the valve spool is biased to the right in FIG. 4 by a control pressure fed through the second port 112. Accordingly, the third port 114 communicates with the sixth port 120 and the fifth and seventh ports 118 and 122 respectively communicate with exhaust ports EX. Conversely, when the second on/off solenoid valve SS2 is turned on, the valve spool is biased to the left as shown in FIG. 4, and accordingly the third port 114 communicates with the fifth port 118 and the fourth port 116 with the seventh port 122.

The third switch valve 46 includes a valve body and a valve spool disposed therein. The valve body of the third switch valve 46 includes: a first port 140 for receiving the line pressure as a control pressure; a second port 142 disposed opposite to the first port 140 for receiving a control pressure from the second switch valve 44; a third port 144 disposed adjacent to the second port 142 for receiving an operating pressure of the first clutch C1 as a control pressure; a fourth port 146 disposed adjacent to the third port 144 for receiving an operating pressure of the third clutch C3 as a control pressure; a fifth port 148 for receiving the line pressure as a source pressure; a sixth port 150 for selectively supplying hydraulic pressure of the fifth port 148 to the second clutch side pressure control valve 64; and a seventh port 152 for exhausting hydraulic pressure that has been output through the sixth port 150.

The valve spool of the third switch valve 46 includes: a first land 154 for receiving a control pressure through the first port 140; a second land 156 for selectively communicating the sixth port 150 with the seventh port 152; a third land 158 for selectively communicating the fifth port 148 with the sixth port 150; a fourth land 160 for receiving a control pressure through the fourth port 146; and a fifth land 162 for receiving a control pressure through the third port 144.

An elastic member 164 is disposed to a side of the fifth land 162, such that the valve spool is always biased to the right in the drawing. According to variation of control pressures supplied through the first, second, third, and fourth ports 140, 142, 144, and 146, the valve spool moves left and right such that the third switch valve 46 selectively supplies, hydraulic pressure fed through the fifth port 148 to a downstream side through the sixth port 150.

The fourth switch valve 48 includes: a valve body and a valve spool disposed therein. The valve body of the fourth switch valve 48 includes a first port 170 for receiving the line pressure; as a control pressure; a second port 172 disposed opposite to the first port 170 for receiving a control pressure from the second switch valve 44; a third port 174 disposed adjacent to the second port 172 for receiving an operating pressure of the first clutch C1 as a control pressure; a fourth port 176 disposed adjacent to the third port 174 for receiving an operating pressure of the third clutch C3 as a control pressure; a fifth port 178 for receiving the line pressure as a source pressure; a sixth port 180 for selectively supplying hydraulic pressure of the fifth port 178 to the second brake side pressure control valve 70; and a seventh port 182 for exhausting hydraulic pressure that has been output through the sixth port 180.

The valve spool of the fourth switch valve 48 includes: a first land 184 for receiving a control pressure through the first port 170; a second land 186 for selectively communicating the sixth port 180 with the seventh port 182; a third land 188 for selectively communicating the fifth port 178 with the sixth port 180; a fourth land 190 for receiving a control pressure through the fourth port 176; and a fifth land 192 for receiving a control pressure through the third port 174.

To a side of the fifth land 192, an elastic member 194 is disposed such that the valve spool is always biased to the right in the drawing. According to variation of control pressures supplied through the first, second, third, and fourth ports 170, 172, 174, and 176, the valve spool moves left and right such that the fourth switch valve 48 selectively supplies hydraulic pressure fed through the fifth port 178 to a downstream side through the sixth port 180.

Figure 5:
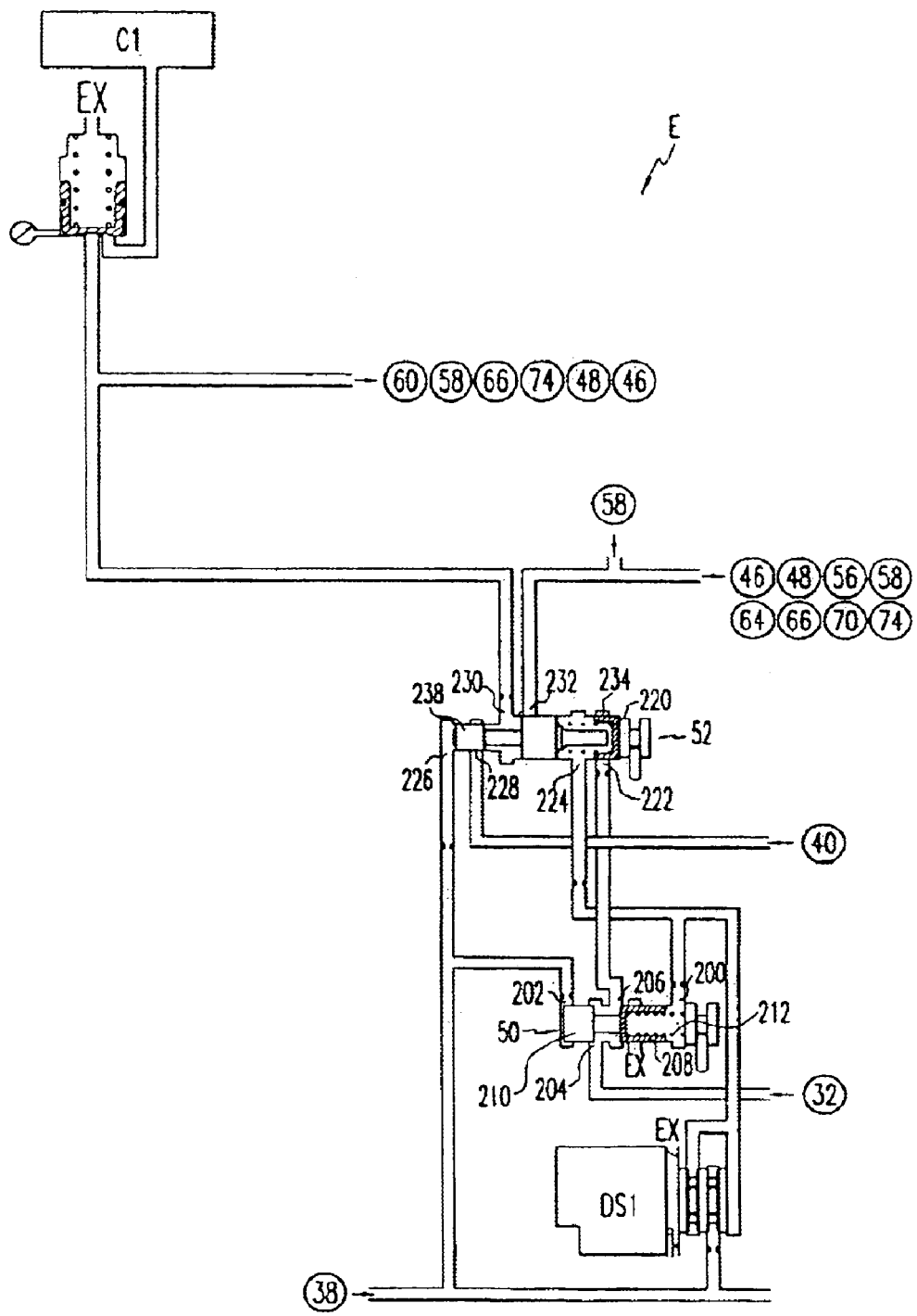
FIG. 5 is an enlarged view of a first clutch control portion in a hydraulic control system according to an embodiment of the present invention.

FIG. 5 is an enlarged view of a first clutch control portion E in a hydraulic control system according to an embodiment of the present invention. The first clutch side switch valve 50 includes a valve body and a valve spool disposed therein. The valve body of the first clutch side switch valve 50 includes: a first port 200 for receiving a control pressure from the first duty control solenoid valve DS1; a second port 202 disposed opposite to the first port 200 for receiving the reduced pressure of the reducing valve 38 as control pressure; a third port 204 for receiving the line pressure as a source pressure; and a fourth port 206 for supplying hydraulic pressure of the third port 204 to the first clutch side pressure control valve 52.

The valve spool of the first clutch side switch valve 50 includes a first land 208 for receiving a control pressure through the first port 200; and a second land 210 for receiving a control pressure through the second port 202 and for selectively communicating the third port 204 with the fourth port 206 cooperatively with the first land 208. To a side of the first land 208, an elastic member 212 is disposed such that the valve spool is always biased to the left in the drawing.

When the first clutch side switch valve 50 is not under a duty control, the valve spool moves to the right in the drawing by a control pressure fed through the second port 202, and accordingly it blocks the third port 204. When a duty control pressure of the first duty control solenoid valve DS1 is fed through the first port 200, the valve spool may move to the left depending on the amount of the duty control pressure. Accordingly it opens the third port 204 such that hydraulic pressure can be fed to the first clutch side pressure control valve 52 as control pressure through the fourth port 206.

The first clutch side pressure control valve 52 includes a valve body; a valve spool disposed therein; and a cup 220 for safely maintaining the moved position of the valve spool. The valve body of the first clutch side pressure control valve 52 includes: a first port 222 for receiving a control pressure from the first clutch side switch valve 50; a second port 224 for receiving a control pressure from the first duty control solenoid valve DS1; a third port 226 for receiving a reduced pressure of the reducing valve 38 as a control pressure; a fourth port 208 for receiving a forward speed pressure from the manual valve 40; a fifth port 230 for supplying hydraulic pressure of the fourth port 228 to the first clutch C1; and a sixth port 232 for exhausting hydraulic pressure that has been output through the fifth port 230.

The valve spool of the first clutch side pressure control valve 52 includes: a first land 236 for receiving control pressure fed through the second port 224 and for selectively opening the sixth port 232; and a second land 238 for receiving a control pressure through the third port 226 and for selectively communicating the fourth port 228 with the fifth port 230 cooperatively with the first land 236. The valve spool is disposed in the valve spool interposing an elastic member 234 and the cup 220 for receiving control pressure fed through the first port 222.

When the first duty control solenoid valve DS1 is not under a duty control, the valve spool moves to the right by control pressure fed through the third port 226, and accordingly blocks the fourth port 228. When a duty control pressure of the first duty control solenoid valve DS1 is fed through the second port 224, the valve spool may move to the left depending on the amount of the duty control pressure. Accordingly it opens the fourth port 228 such that hydraulic pressure can be fed to the first clutch C1 as an operating pressure through the fifth port 230.

And then control pressure is subsequently fed from the first clutch side switch valve 50 to the first port 222 such that the cup 220 fully exerts the valve spool, and, thereby maximum operating pressure is supplied to the first clutch C1. That is, in this embodiment, according to a control of the first duty control solenoid valve DS1, a pilot hydraulic pressure is supplied to the first clutch C1 due to supply of a control pressure to the second port 224. Then, full line pressure is supplied to the first clutch C1 near an end of a speed-shift due to a supply of a control pressure to the first port 222.

Figure 6:
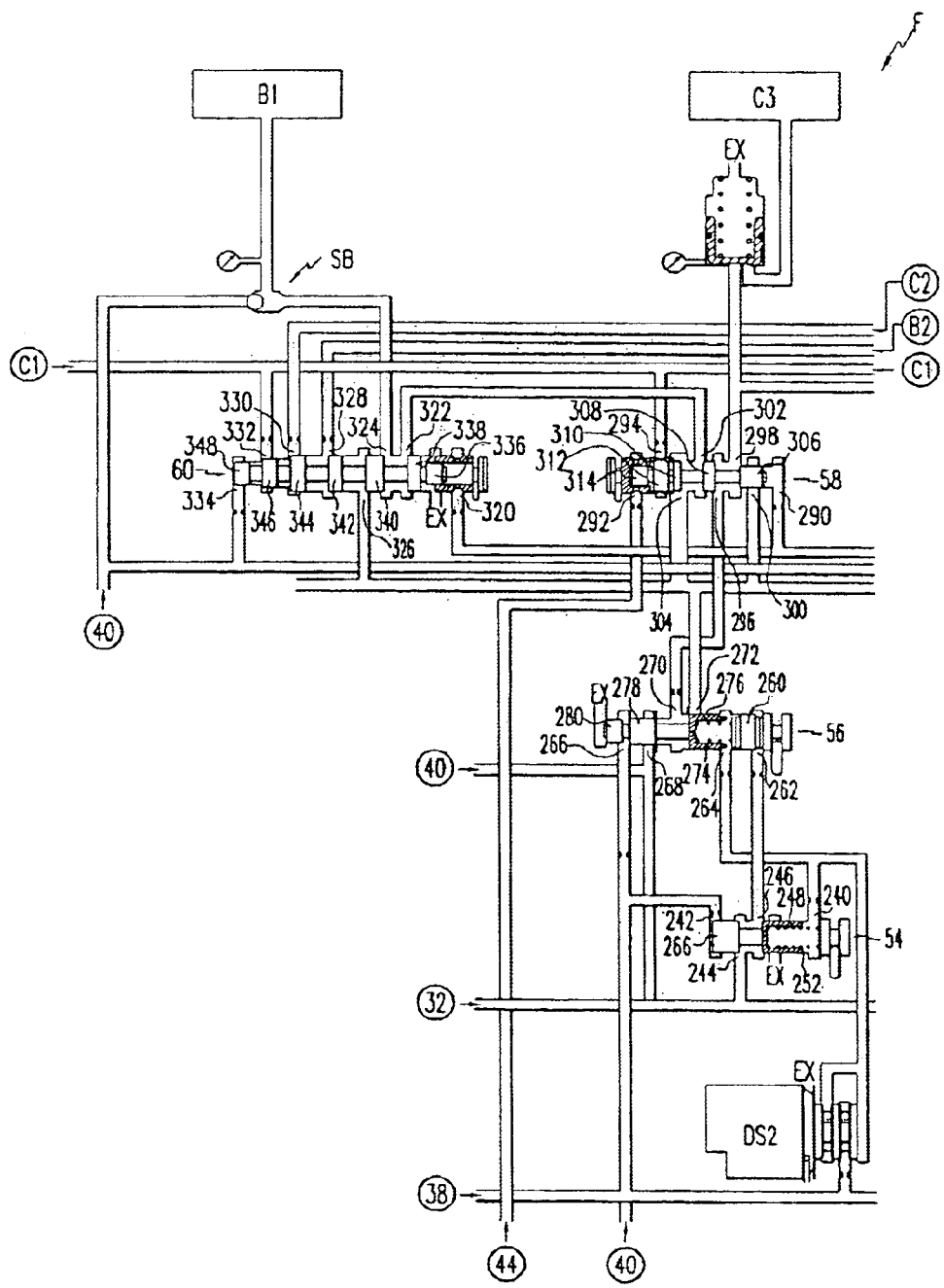
FIG. 6 is an enlarged view of a B1/C3 control portion in a hydraulic control system according to an embodiment of the present invention.

FIG. 6 is an enlarged view of a B1/C3 control portion in a hydraulic control system according to an embodiment of the present invention. The third clutch side switch valve 54 includes a valve body and a valve spool disposed therein.

The valve body of the third clutch side switch valve 54 includes: a first port 240 for receiving a control pressure from the second duty control solenoid valve DS2; a second port 242 disposed opposite to the first port 240 for receiving the reduced pressure of the reducing valve 38 as a control pressure; a third port 244 for receiving the line pressure as a source pressure; and a fourth port 246 for supplying hydraulic pressure of the third port 244 to the third clutch side pressure control valve 56. The valve spool of the third clutch side switch valve 54 includes: a first land 248 for receiving a control pressure through the first port 240; and a second land 250 for receiving a control pressure through the second port 242 and for selectively communicating the third port 244 with the fourth port 246 cooperatively with the first land 248.

An elastic member 252 is disposed to a side of the first land 248, such that the valve spool is always biased to the left in the drawing. When the third clutch side switch valve 54 is not under a duty control, the valve spool moves to the right in the drawing by a control pressure fed through the second port 242, and accordingly it blocks the third port 244.

When a duty control pressure of the second duty control solenoid valve DS2 is fed through the first port 240, the valve spool may move to the left depending on the amount of the duty control pressure, and accordingly it opens the third port 244 such that hydraulic pressure can be fed to the third clutch side pressure control valve 56 as control pressure through the fourth port 246.

The third clutch side pressure control valve 56 includes: a valve body; a valve spool disposed therein; and a floating member 260 for safely maintaining the moved position of the valve spool. The valve body of the third clutch side pressure control valve 56 includes: a first port 262 for receiving a control pressure from the third clutch side switch valve 54; a second port 264 for receiving a control pressure from the second duty control solenoid valve DS2; a third port 266 for receiving a reduced pressure of the reducing valve 38 as a control pressure; a fourth port 268 for receiving a forward speed pressure from the manual valve 40; a fifth port 270 for supplying hydraulic pressure of the fourth port 268 to the control valve 58; and a sixth port 272 for exhausting hydraulic pressure that has been output through the fifth port 270.

The valve spool of the third clutch side pressure control valve 56 includes: a first land 276 for receiving control pressure fed through the second port 264 and for selectively opening the sixth port 272; a second land 278 for receiving a control pressure through the third port 266 and for selectively communicating the fourth port 268 with the fifth port 270 cooperatively with the first land 276; and a third land 280 for receiving control pressure fed through the third port 266. The valve spool is disposed in the valve body interposing an elastic member 274 and the floating member 260 for receiving control pressure fed through the first port 262.

When the second duty control solenoid valve DS2 is not under a duty control pressure (?), the valve spool moves to the right by control pressure fed through the third port 266, and accordingly blocks the fourth port 268. When a duty control pressure of the second duty control solenoid valve DS2 is fed through the second port 264, the valve spool may move to the left depending on the amount of the duty control pressure. Accordingly it opens the fourth port 268 such that hydraulic pressure can be fed to the control valve 58 as an operating pressure thereof through the fifth port 270. And then control pressure is subsequently fed from the third clutch side switch valve 54 to the first port 262 such that the floating member 260 fully exerts the valve spool and thereby maximum operating pressure is supplied to the control valve 58.

That is, in this embodiment, according to a control of the second duty control solenoid valve DS2, a pilot hydraulic pressure is supplied to the control valve 58 due to supply of a control pressure to the second port 264, and then full line pressure is supplied to the control valve 58 near an end of speed-shift due to a supply of a control pressure to the first port 262. The control valve 58 transmits operating pressure received from the third clutch side pressure control valve 56, and it includes a valve body and a valve spool disposed therein.

The valve body of the control valve 58 includes: a first port 290 for receiving the line pressure as a control pressure, a second port 292 disposed opposite to the first port 290 for receiving a control pressure from the second switch valve 44; a third port 294 for receiving an operating pressure of the first clutch C1 as a control pressure; a fourth port 296 for receiving an operating pressure of the third clutch side pressure control valve 56; a fifth port 298 for selectively supplying hydraulic pressure fed through the fourth port 296 to the third clutch C3; a sixth port 300 disposed between the first port 290 and the fourth port 296 for selectively exhausting hydraulic pressure that has been output through the fifth port 298; a seventh port 302 disposed between the third port 294 and fifth port 298 and connected to the first brake side switch valve 60; and an eighth port 304 for exhausting hydraulic pressure that has been exhausted from the seventh port 302.

The valve spool of the control valve 58 includes: a first land 306 for receiving a control pressure through the first port 290 and for selectively opening the sixth port 300; a second land 308 for selectively communicating the fourth port 296 with the fifth port 298; a third land 310 for selectively communicating the seventh port 302 with the eighth port 304; a fourth land 312 for receiving a control pressure through the third port 294; and a fifth land 314 for receiving a control pressure through the second port 272.

When the valve spool moves to the left in the drawing, hydraulic pressure fed through the fourth port 296 is supplied to the third clutch C3 through the fifth port 298. Conversely, when the valve spool moves to the right in the drawing, hydraulic pressure fed through the fourth port 296 is supplied to the first brake side fail-safe valve 60 through the seventh port 302.

The first brake side fail-safe valve 60 includes a valve body and a valve spool disposed therein. The valve body of the first brake side fail-safe valve 60 includes: a first port 320 for receiving the line pressure; as a control pressure, a second port 322 communicating with the seventh port 302 of the control valve 58; a third port 324 for supplying hydraulic pressure fed through the second port 322 to the first brake B1; a fourth port 326 for exhausting hydraulic pressure exhausted from the third port 324; a fifth port 328 for receiving operating pressure of the second brake B2 as a control pressure; a sixth port 330 for receiving operating pressure of the second clutch C2 as a control pressure; a seventh port 332 for receiving operating pressure of the first clutch C1 as a control pressure; and an eighth port 334 for receiving reverse speed pressure as a control pressure.

The valve spool of the first brake side fail-safe valve 60 includes: a first land 336 for receiving a control pressure through the first port 320; a second land 338 adjacent to the first land 336; a third land 340 for selectively communicating the third port 324 with the second and fourth ports 322 and 326; a fourth land 342 for receiving control pressure though the fifth port 328, and cooperating with the third land 340, for selectively communicating the third port 324 with the fourth port 326; a fifth land 344 for receiving control pressure through the sixth port 330; a sixth land 346 for receiving control pressure through the seventh port 332; and a seventh land 348 for receiving control pressure through the eighth port 334.

Therefore, the first brake side fail-safe valve 60 either supplies hydraulic pressure fed from the third clutch side pressure control valve 56 to the first brake B1 or performs a fail-safe function in which it releases hydraulic pressure supply to the first brake B1 in the case that hydraulic pressures are simultaneously supplied to the second brake B2 and the first and second clutches C1 and C2, e.g., by a malfunction of the automatic transmission.

Figure 7:
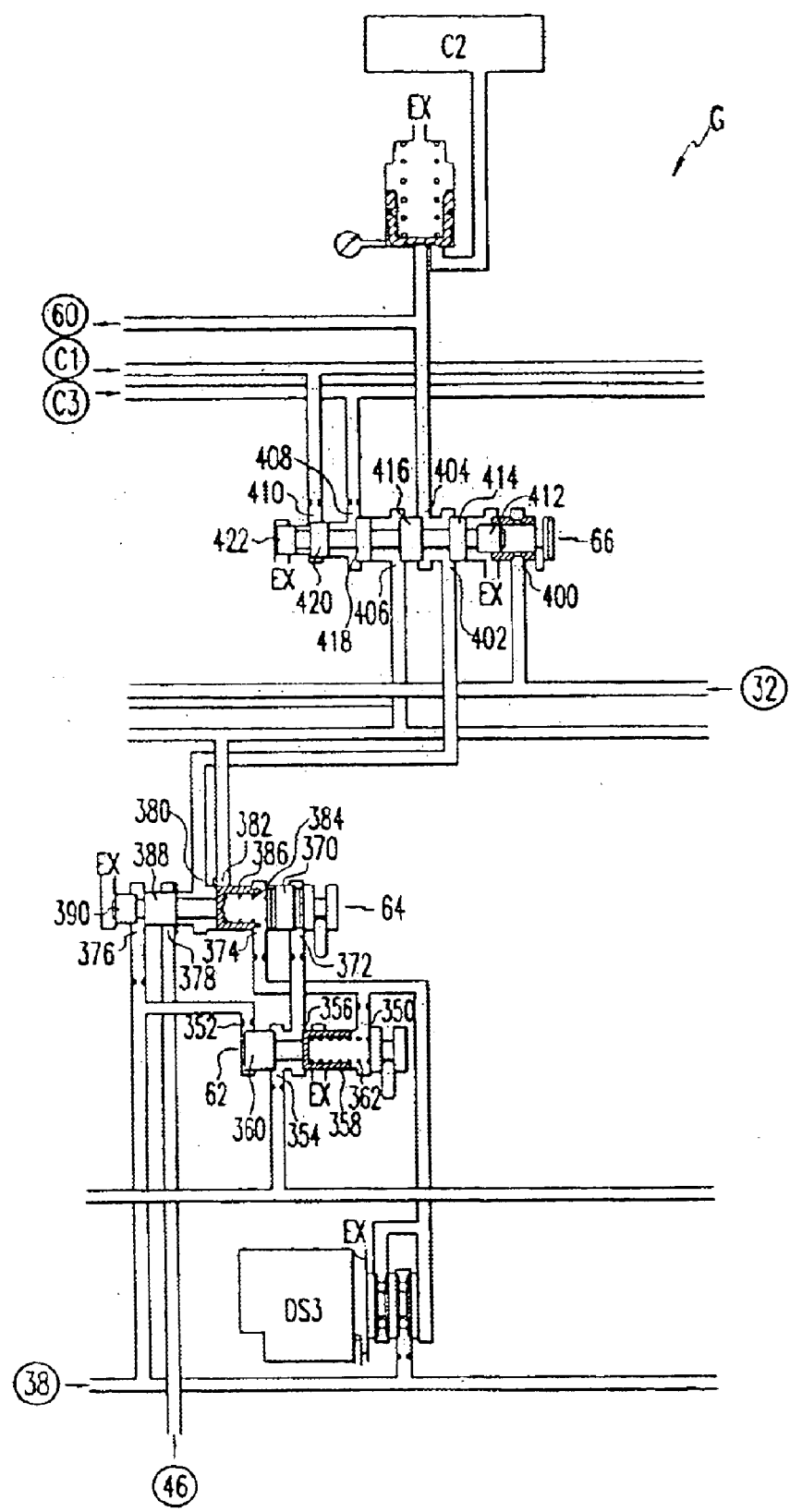
FIG. 7 is an enlarged view of a second clutch control portion in a hydraulic control system according to an embodiment of the present invention.

FIG. 7 is an enlarged view of a second clutch control portion G in a hydraulic control system according to an embodiment of the present invention. The second clutch side switch valve 62 includes a valve body and a valve spool disposed therein. The valve body of the second clutch side switch valve 62 includes: a first port 350 for receiving a control pressure from the third duty control solenoid valve DS3; a second port 352 disposed opposite to the first port 350 for receiving the reduced pressure of the reducing valve 38 as a control pressure; a third port 354 for receiving the line pressure as a source pressure; and a fourth port 356 for supplying hydraulic pressure of the third port 354 to the second clutch side pressure control valve 64.

The valve spool of the second clutch side switch valve 62 includes: a first land 358 for receiving a control pressure through the first port 350; and a second land 360 for receiving a control pressure through the second port 352 and for selectively communicating the third port 354 with the fourth port 356 cooperatively with the first land 358. To a side of the first land 358, an elastic member 362 is disposed such that the valve spool is always biased to the left in the drawing.

When the second clutch side switch valve 62 is not under a duty control, the valve spool moves to the right in the drawing by a control pressure fed through the second port 352, and accordingly it blocks the third port 354. When a duty control pressure of the third duty control solenoid valve DS3 is fed through the first port 350, the valve spool may move to the left depending on the amount of the duty pressure. Accordingly it opens the third port 354 such that hydraulic pressure can be fed to the second clutch side pressure control valve 64 as control pressure through the fourth port 356.

The second clutch side pressure control valve 64 includes a valve body, a valve spool disposed therein, and a floating member 370 for safely maintaining the moved position of the valve spool. The valve body of the second clutch side pressure control valve 64 includes: a first port 372 for receiving a control pressure from the second clutch side switch valve 62; a second port 374 for receiving a control pressure from the third duty control solenoid valve DS3; a third port 376 for receiving a reduced pressure of the reducing valve 38 as a control pressure; a fourth port 378 for receiving a hydraulic pressure from the third switch valve 46; a fifth port 380 for supplying hydraulic pressure of the fourth port 378 to the second clutch fail-safe valve 66; and a sixth port 382 for exhausting hydraulic pressure that has been output through the fifth port 380.

The valve spool of the second clutch side pressure control valve 64 includes: a first land 386 for receiving control pressure fed through the second port 374 and for selectively opening the sixth port 382; a second land 388 for receiving a control pressure through the third port 376 and for selectively communicating the fourth port 378 with the fifth port 380 cooperatively with the first land 386; and a third land 390 for receiving control pressure fed through the third port 376. The valve spool is disposed in the valve body interposing an elastic member 384 and the floating member 370 for receiving control pressure fed through the first port 372.

When the third duty control solenoid valve DS3 is not under a duty control, the valve spool moves to the right by control pressure fed through the third port 376, and accordingly blocks the fourth port 378. When a duty control pressure of the third duty control solenoid valve DS3 is fed through the second port 374, the valve spool may move to the left depending on the amount of the duty pressure. Accordingly it opens the fourth port 378 such that hydraulic pressure can be fed to the second clutch side fail-safe valve 66 as an operating pressure through the fifth port 380. And then control pressure is subsequently fed from the second clutch side switch valve 62 to the first port 372 such that the floating member 370 fully exerts the valve spool, and, thereby maximum operating pressure is supplied to the second clutch side fail-safe valve 66.

That is, in this embodiment, according to a control of the third duty control solenoid valve DS3, a pilot hydraulic pressure is supplied to the second clutch side fail-safe valve 66 due to supply of a control pressure to the second port 374. Then, full line pressure is supplied to the second clutch side fail-safe valve 66 near an end of a speed-shift due to a supply of a control pressure to the first port 372.

The second clutch side fail-safe valve 66 includes: a valve body and a valve spool disposed therein. The valve body of the second clutch side fail-safe valve 66 includes a first port 400 for receiving the line pressure as a control pressure; a second port 402 communicating with the fifth port 380 of the second clutch side pressure control valve 64; a third port 404 for supplying hydraulic pressure fed through the second port 402 to the second clutch C2; a fourth port 406 for exhausting hydraulic pressure exhausted from the third port 404; a fifth port 408 for receiving operating pressure of the third clutch C3 as a control pressure; and a sixth port 410 for receiving operating pressure of the first clutch C1 as a control pressure.

The valve spool of the second clutch side fail-safe valve 66 includes: a first land 412 for receiving a control pressure through the first port 400; a second land 414 adjacent to the first land 412; a third land 416 for selectively communicating the third port 404 with the second and fourth ports 402 and 406; a fourth land 418 for receiving control pressure though the fifth port 408, and cooperating with the third land 416 for selectively communicating the third port 404 with the fourth port 406; a fifth land 420 for receiving control pressure through the sixth port 410; and a sixth land 422 for receiving control pressure through the sixth port 410 together with the fifth land 420. Therefore, the second clutch side fail-safe valve 66 either supplies hydraulic pressure fed from the second clutch side pressure control valve 64 to the second clutch C2, or performs a fail-safe function in which it prevents a simultaneous operation of the first, second, and third clutches C1, C2, and C3 caused by e.g., a malfunction of the automatic transmission.

Figure 8:
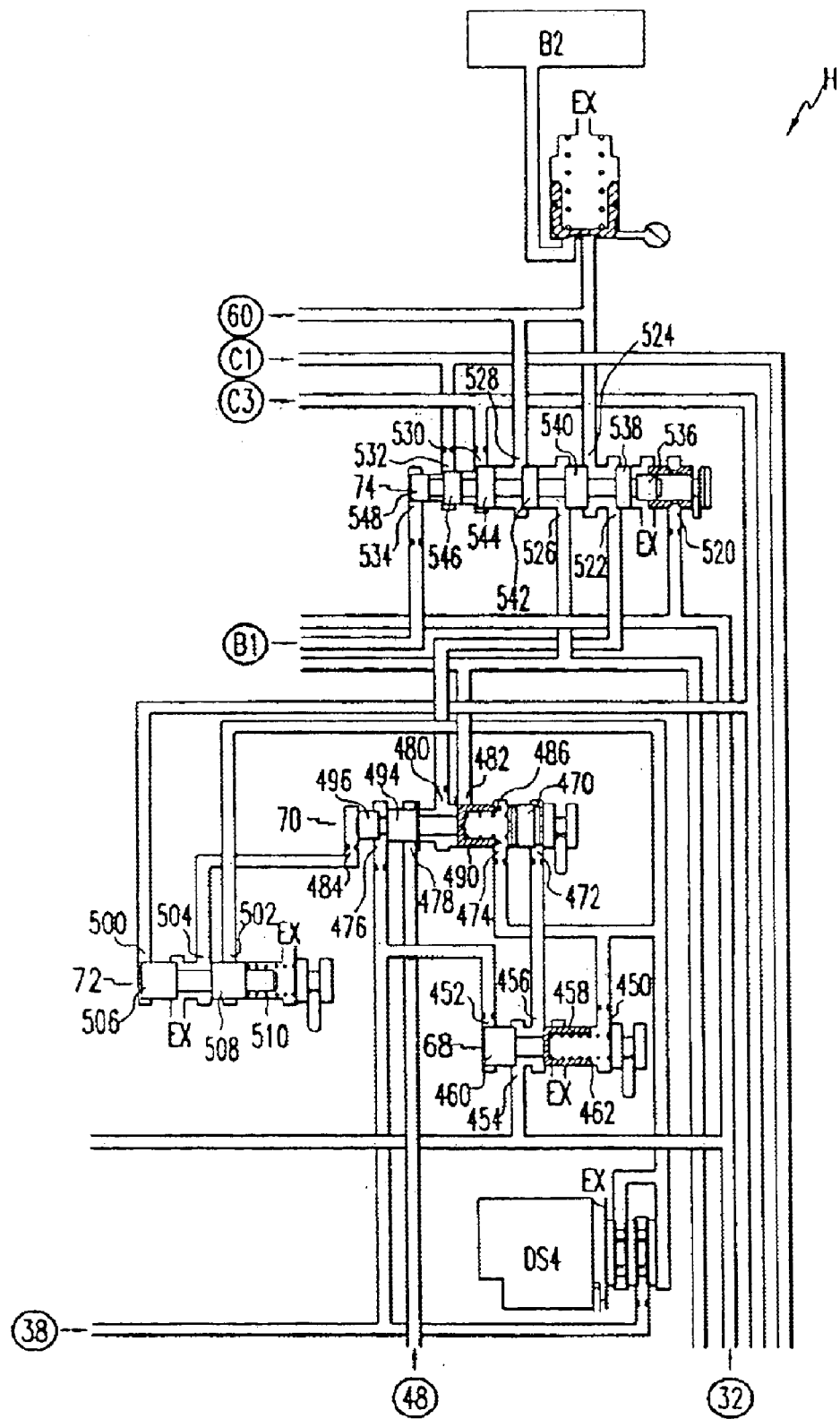
FIG. 8 is an enlarged view of a B2 control portion in a hydraulic control system according to an embodiment of the present invention.

FIG. 8 is an enlarged view of a B2 control portion H in a hydraulic control system according to an embodiment of the present invention. The second brake side switch valve 68 includes a valve body and a valve spool disposed therein. The valve body of the second clutch side switch valve 68 includes: a first port 450 for receiving a control pressure from the fourth duty control solenoid valve DS4; a second port 452 disposed opposite to the first port 450 for receiving the reduced pressure of the reducing valve 38 as a control pressure; a third port 454 for receiving the line pressure as a source pressure; and a fourth port 456 for supplying hydraulic pressure of the third port 454 to the second brake side pressure control valve 70.

he valve spool of the second brake side switch valve 62 includes: a first land 458 for receiving a control pressure through the first port 450; and a second land 460 for receiving a control pressure through the second port 452 and for selectively communicating the third port 454 with the fourth port 456 cooperatively with the first land 458.

To a side of the first land 458, an elastic member 462 is disposed such that the valve spool is always biased to the left in the drawing. When the second brake side switch valve 68 is not under a duty control, the valve spool moves to the right in the drawing by a control pressure fed through the second port 452, and accordingly it blocks the third port 454.

When a duty control pressure of the fourth duty control solenoid valve DS4 is fed through the first port 450, the valve spool may move to the left depending on the amount of the duty pressure. Accordingly it opens the third port 454 such that hydraulic pressure can be fed to the second brake side pressure control valve 70 as control pressure through the fourth port 456.

The second brake side control valve 70 includes: a valve body; a valve spool disposed therein; and a floating member 470 for safely maintaining the moved position of the valve spool. The valve body of the second brake side pressure control valve 70 includes: a first port 472 for receiving a control pressure from the second brake side switch valve 68; a second port 474 for receiving a control pressure from the fourth duty control solenoid valve DS4; a third port 476 for receiving a reduced pressure of the reducing valve 38 as a control pressure; a fourth port 478 for receiving a hydraulic pressure from the fourth switch valve 48; a fifth port 480 for supplying hydraulic pressure of the fourth port 478 to the second brake side fail-safe valve 74; a sixth port 482 for exhausting hydraulic pressure that has been output through the fifth port 380; and a seventh port 484 for receiving control pressure from the sixth-speed-related switch valve 72.

The valve spool of the second brake side pressure control valve 70 includes: a first land 490 for receiving control pressure fed through the second port 474 and for selectively opening the sixth port 482; a second land 492 for receiving a control pressure through the third port 476 and for selectively communicating the fourth port 478 with the fifth port 480 cooperatively with the first land 490; a third land 494 for receiving control pressure fed through the third port 476; and a fourth land 496 for receiving control pressure from the sixth-speed-related switch valve 72.

The valve spool is disposed in the valve body interposing an elastic member 486 and the floating member 470 for receiving control pressure fed through the first port 472. The sixth-speed-related switch valve 72 includes a valve body and a valve spool disposed therein.

The valve body of the sixth-speed-related switch valve 72 includes: a first port 500 for receiving the operating pressure of the third clutch C3 as a control pressure; a second port 502 for receiving a control pressure controlled by the fourth duty control solenoid valve DS4; and a third port 504 for supplying hydraulic pressure fed through the second port 502 to the second brake side pressure control valve 70 as a control pressure thereof. The valve spool of the sixth-speed-related switch valve 72 includes: a first land 506 for receiving a control pressure through the first port 500; and a second land 508 selectively communicating the second port 502 with the third port 504.

An elastic member 510 is disposed to a side of the second land 508, such that the valve spool is always biased to the left in the drawing. When the fourth duty control solenoid valve DS4 is not under a duty control, the valve spool of the second brake side pressure control valve 70 moves to the right by control pressure fed through the third port 476, and accordingly blocks the fourth port 478.

When a duty control pressure of the fourth duty control solenoid valve DS4 is fed through the second port 474, the valve spool may move to the left depending on the amount of the duty pressure, and accordingly it opens the fourth port 478 such that hydraulic pressure can be fed to the second brake side fail-safe valve 74 as an operating pressure through the fifth port 480. And then control pressure is subsequently fed from the second brake side switch valve 68 to the first port 472 such that the floating member 470 fully exerts the valve spool and thereby maximum operating pressure is supplied to the second brake side fail-safe valve 74.

That is, in this embodiment, according to a control of the fourth duty control solenoid valve DS4, a pilot hydraulic pressure is supplied to the second brake side fail-safe valve 66 due to supply of a control pressure to the second port 474. Then, full line pressure is supplied to the second brake side fail-safe valve 74 near an end of a speed-shift due to a supply of a control pressure to the first port 472.

In high shift-speeds such as forward 3–5 speeds D3–D5 (refer to FIG. 2) in which the third clutch C3 is operated, operating pressure of the third clutch C3 is supplied to the sixth-speed-related switch valve 72 as a control pressure through its first port 500. In this case, the valve spool of the sixth-speed-related switch valve 72 moves to the right in the drawing. Accordingly the second port 502 for receiving control pressure of the fourth duty control solenoid valve DS4 becomes in communication with the third port 504.

The control pressure is in turn supplied to the seventh port 484 of the second brake side pressure control valve 70 through the third port 504. Therefore, the valve spool of the second brake side pressure control valve 70 moves slightly to the right in the drawing by the pressure supplied to the seventh port 484.

Accordingly, the second brake side pressure control valve 70 reduces operating pressure for the second brake B2 that is output through the fifth port 480. Therefore, the second brake side pressure control valve 70 can control the operating pressure of the second brake B2 in accordance with a required torque capacity of high and low shift-speeds. This implies an enhancement of preciseness in hydraulic pressure control.

The second brake side fail-safe valve 74 includes a valve body and a valve spool disposed therein. The valve body of the second brake side fail-safe valve 74 includes: a first port 520 for receiving the line pressure as a control pressure; a second port 522 communicating with the fifth port 480 of the second brake side pressure control valve 70; a third port 524 for supplying hydraulic pressure fed through the second port 522 to the second brake B2; a fourth port 526 for exhausting hydraulic pressure exhausted from the third port 524; a fifth port 528 for receiving operating pressure of the second brake B2 as a control pressure; a sixth port 530 for receiving operating pressure of the third clutch C3 as a control pressure; a seventh port 532 for receiving operating pressure of the first clutch C1 as a control pressure; and an eighth port 534 for receiving operating pressure of the first brake B1 as a control pressure.

The valve spool of the second brake side fail-safe valve 74 includes: a first land 536 for receiving a control pressure through the first port 420; a second land 538 adjacent to the first land 536; a third land 540 for selectively communicating the third port 524 with the second and fourth ports 522 and 526; a fourth land 542 for receiving control pressure though the fifth port 528 and for selectively communicating the third port 524 with the fourth port 526 cooperatively with the third land 540; a fifth land 544 for receiving control pressure through the sixth port 530; a sixth land 546 for receiving control pressure through the seventh port 532; and a seventh land 548 for receiving control pressure through the eighth port 534.

Therefore, the second brake side fail-safe valve 74 either supplies hydraulic pressure fed from the second brake side pressure control valve 70 to the second brake B2, or performs a fail-safe function in which it prevents a simultaneous operation of the second brake B2 and the first and third clutches C1 and C3 caused by e.g., a malfunction of the automatic transmission.

According to a hydraulic control system of an embodiment of the present invention, an accumulator AC1 is disposed to the forward speed pressure line such that the forward speed pressure is stabilized. In addition, an accumulator AC2 is added to a line from the third and fourth switch valves 46 and 48 to the fail-safe valves 60, 66, and 74 such that the pressure of the lines is stabilized. The accumulator AC 2 also enables stabilization of hydraulic pressure exhausted from the first clutch side pressure control valve 52, the third clutch side pressure control valve 56, the second clutch side pressure control valve 64, and the second brake side pressure control valve 70.

At an entrance of the first brake B1 which operates at a low shift-speed and a reverse speed (refer to FIG. 2), a shuttle valve SB is disposed such that the first brake B1 can receive both the reverse speed pressure supplied directly from the manual valve 40 and hydraulic pressure supplied from the first brake side fail-safe valve 60 at the low shift-speed.

An accumulator is added to each of lines entering to the first, second, and third clutches C1, C2, and C3 and the second brake B2.

According to such a hydraulic control system of an embodiment of the present invention, the first and second on/off solenoid valves SS1 and SS2 are operated as shown in the following table 1.

TABLE 1

| Solenoid valve | | Signal pressure of second switch valve | | | |
|---|---|---|---|---|---|
| SS1 | SS2 | 120 | 122 | 118 | Shift-speed |
| ON | ON | X | O | X | D3, D4, D5, 3↔1, 3↔4, 3↔5, 4↔5 |
| ON | OFF | X | X | X | 2↔3, 5↔6 |
| OFF | OFF | O | X | X | D1, D2, D4, D6, N↔D, 1↔2, 2↔4, 4↔6 |
| OFF | ON | X | X | O | L1↔L2, L2↔L3, L1↔L3 |

As shown in the above table 1, the first and second solenoid valves SS1 and SS2 are both off-controlled in the neutral N state. In this case, referring to FIG. 4, the first and second switch valves 42 and 44 do not receive control pressures from their first ports 90 and 110, and receive control pressures from their second ports 92 and 112.

Therefore, regarding the first switch valve 42, its valve spool moves to the left in the drawing. Thereby, hydraulic pressure fed through the third port 94 is output though the fourth port 96 and is supplied to second switch valve 44 through the third port 114. Regarding the second switch valve 44, its valve spool moves to the right in the drawing. So, the hydraulic pressure fed through the third port 114 is output through the sixth port 120 and is supplied to third switch valve 46 through the second port 142, and thereby moves the valve spool of the third switch valve 46 to the right in the drawing. In this case, because the fifth port 148 of the third switch valve 46 becomes closed, the hydraulic pressure at the fifth port 148 supplied through the line pressure line 84 becomes stationary.

Regarding the fourth switch valve 48, because the line pressure is supplied thereto through the first port 170, the valve spool moves to the right in the drawing and accordingly the fifth port 178 communicates with the sixth port 180. The reduced pressure of the reducing valve 38 remains supplied to the first-fourth duty control solenoid valves DS1–DS4, the switch valves 50, 54, 62, and 68, the pressure control valves 52, 56, 64, and 70 as their control pressures.

When a driver moves the manual valve 40 to a D range, e.g. for moving the vehicle, a D range pressure (forward speed pressure) is supplied to the first and third clutch side pressure control valves 52 and 56 through the forward speed pressure line 84, and is also supplied to the second brake side pressure control valve 70 through the fourth port 478 via the fourth switch valve 48.

Now a transmission control unit (not shown) starts a duty control of the first duty control solenoid valve DS1. In this case, as shown in FIG. 5, duty pressure of the first duty control solenoid valve DS1 is supplied to the first clutch side pressure control valve 52 through the second port 224. Therefore, the valve spool of the pressure control valve 52, once moved to the right in the drawing by the control pressure from the third port 226, starts slowly moving to the left so as to communicate the fourth port 228 with the fifth port 230, and thereby the D range pressure becomes supplied to the first clutch C1.

At the same time, the duty pressure of the first duty control solenoid valve DS1 is also supplied to the first clutch side switch valve 50 through the first port 200. Accordingly, the valve spool of the switch valve 50 moves to the left in the drawing. Therefore, the line pressure fed from the third port 204 is output through the fourth port 206 to be supplied to the first clutch side pressure control valve 52 through the first port 222. This forces the cup 220 (and resultantly the valve spool) further to the left in the drawing. So, high operating pressure is supplied to the first clutch C1 and shifting to a forward first speed is complete.

When the vehicle speed increases at the first speed, the transmission control unit initiates a duty control of the fourth duty control solenoid valve DS4 (refer to FIG. 8). In this case, duty pressure of the fourth duty control solenoid valve DS4 is supplied to the second brake side pressure control valve 70 through the second port 474. Therefore, the valve spool of the pressure control valve 70, once moved to the right in the drawing by the control pressure from the third port 476, starts slowly moving to the left so as to communicate the fourth port 478 with the fifth port 480. Thereby, the hydraulic pressure that is stationary at the fourth port 478 begins outputting through the fifth port 480 to be supplied to the second brake side fail-safe valve 74 through the second port 522.

Since the valve spool of the second brake side fail-safe valve 74 is moved to the left in the drawing by the line pressure fed through the first port 520, hydraulic pressure fed through the second port 522 is output through the third port 524 so as to be supplied to the second brake B2 as an operating pressure thereof. At the same time, the duty pressure of the fourth duty control solenoid valve DS4 is also supplied to the second brake side switch valve 68 through the first port 450. Accordingly, the valve spool of the switch valve 68 moves to the left in the drawing.

Therefore, the line pressure fed from the third port 454 is output through the fourth port 456 to be supplied to the second brake side pressure control valve 70 through the first port 472, and, thereby forces the floating member 470 (and resultantly the valve spool) further to the left in the drawing. So, high operating pressure is supplied to the second brake B2 and shifting to a forward second speed is complete.

The control pressure of the fourth duty control solenoid valve DS4 is also supplied to the sixth-speed-related switch valve 72 through the second port 502. However, in the forward second speed D2, valve spool remains moved to the left by the elastic force of the elastic member 510.

When the vehicle speed increases at the second speed D2, the transmission control unit stops the duty control of the fourth duty control solenoid valve DS4 and begins a duty control of the third duty control solenoid valve DS3. In this case, the first on/off solenoid valve SS1 is turned on at the starting of the shifting, and then the second on/off solenoid valve SS2 is turned on at the end of the shifting. Therefore, the hydraulic pressure that has been supplied to the second brake B2 is now exhausted through the fourth port 526 due to port conversion of the second brake side fail-safe valve 74.

Regarding the first switch valve 42, its valve spool moves to the right in the drawing when the first on/off solenoid valve SS1 is turned on, and, thereby hydraulic pressure fed through the third port 94 is output though the fifth port 98 and is supplied to second switch valve 44 through the fourth port 116. However, the hydraulic pressure of the fourth port 116 is unchanged, since the second switch valve 44 is not yet duty controlled.

Regarding the third switch valve 46, its valve spool is positioned to the left in the drawing since control pressure is not supplied to the second port 142. So, the hydraulic pressure fed through the fifth port 148 is output through the sixth port 150 and is supplied to the second clutch side hydraulic pressure control valve 64 (refer to FIG. 7) through the fourth port 378. At this time, duty pressure of the third duty control solenoid valve DS3 is supplied to the second clutch side pressure control valve 64 through the second port 374. Therefore, the valve spool of the pressure control valve 64, once moved to the right in the drawing by the control pressure from the third port 376, starts slowly moving to the left so as to communicate the fourth port 378 with the fifth port 380, and thereby the hydraulic pressure from the fourth port 378 is output through the fifth port 380 to be supplied to the second clutch side fail-safe valve 66 through the second port 402.

Since the valve spool of the second clutch side fail-safe valve 66 is moved to the left in the drawing by the line pressure fed through the first port 400, hydraulic pressure fed through the second port 402 is output through the third port 404 so as to be supplied to the second clutch C2 as an operating pressure thereof. At the same time, the duty pressure of the third duty control solenoid valve DS3 is also supplied to the second clutch side switch valve 62 through the first port 350, and accordingly, the valve spool of the switch valve 62 moves to the left in the drawing.

Therefore, the line pressure fed from the third port 354 is output through the fourth port 356 to be supplied to the second clutch side pressure control valve 64 through the first port 372 and thereby forces the floating member 370 (and resultantly the valve spool) further to the left in the drawing. So, high operating pressure is supplied to the second clutch C2 and shifting to a forward third speed D3 is complete.

When shifting to the third speed is finished, the second on/off solenoid valve SS2 is turned on, and accordingly the valve spool of the second switch valve 44 moves to the left in the drawing. Therefore, hydraulic pressure that has been stationary at the fourth port 116 begins outputting through the seventh port 122 to be supplied to the fourth switch valve 48 through the second port 172. Accordingly, the fourth switch valve 48 completely blocks the D range pressure that has been supplied to the second brake side pressure control valve 70 and exhausts a downstream side pressure thereof through the seventh port 182 (refer to FIG. 4).

When the vehicle speed increases at the third speed D3, the transmission control unit stops the duty control of the third duty control solenoid valve DS3 and begins a duty control of the second duty control solenoid valve DS2. Then, the hydraulic pressure supplied to the second clutch C2 is exhausted and a duty pressure according to the duty control of second duty control solenoid valve DS2 is supplied to the third clutch side pressure control valve 56 through the second port 264 (refer to FIG. 6).

Therefore, the valve spool of the pressure control valve 56, once moved to the right in the drawing by the control pressure from the third port 266, begins slowly moving to the left so as to communicate the fourth port 268 with the fifth port 270, and, thereby the hydraulic pressure supplied from the fourth port 268 is output through the fifth port 270 to be supplied to the third clutch side fail-safe valve 58 through the fourth port 296.

Since the valve spool of the third clutch side fail-safe valve 58 is moved to the left in the drawing by the line pressure fed through the first port 290, hydraulic pressure fed through the fourth port 296 is output through the fifth port 298 so as to be supplied to the third clutch C3 as an operating pressure thereof.

At the same time, the duty pressure of the second duty control solenoid valve DS2 is also supplied to the third clutch side switch valve 54 through the first port 240, and accordingly, the valve spool of the switch valve 54 moves to the left in the drawing.

Therefore, the line pressure fed from the third port 244 is output through the fourth port 256 to be supplied to the third clutch side pressure control valve 56 through the first port 262 and thereby exerts the floating member 260 (and resultantly the valve spool) further to the left in the drawing. So, high operating pressure is supplied to the third clutch C3 and shifting to a forward fourth speed D4 is finished.

When the vehicle speed increases at the fourth speed D4, the transmission control unit stops the duty control of the first duty control solenoid valve DS1 and begins a duty control of the third duty control solenoid valve DS3. Then the hydraulic pressure supplied to the first clutch C1 is exhausted and a duty pressure according to the duty control of third duty control solenoid valve DS3 is supplied to the second clutch side pressure control valve 64 through the second port 374 (refer to FIG. 7).

Therefore, the valve spool of the pressure control valve 64, once moved to the right in the drawing by the control pressure from the third port 376, begins slowly moving to the left so as to communicate the fourth port 378 with the fifth port 380, and thereby the hydraulic pressure supplied from the fourth port 378 is output through the fifth port 380 to be supplied to the second clutch side fail-safe valve 66 through the second port 402.

Since the valve spool of the second clutch side fail-safe valve 66 is moved to the left in the drawing by the line pressure fed through the first port 400, hydraulic pressure fed through the second port 402 is output through the third port 404 so as to be supplied to the second clutch C2 as an operating pressure thereof. At the same time, the duty pressure of the third duty control solenoid valve DS3 is also supplied to the second clutch side switch valve 62 through the first port 350, and accordingly, the valve spool of the switch valve 62 moves to the left in the drawing.

Therefore, the line pressure fed from the third port 354 is output through the fourth port 356 to be supplied to the second clutch side pressure control valve 64 through the first port 372 and thereby forces the floating member 370 (and resultantly the valve spool) further to the left in the drawing. So, high operating pressure is supplied to the second clutch C2 and shifting to a fifth speed D5 is finished.

When the vehicle speed increases at the fifth speed D5, the transmission control unit stops the duty control of the third duty control solenoid valve DS3 and begins a duty control of the fourth duty control solenoid valve DS4. Then a duty pressure according to the duty control of the fourth duty control solenoid valve DS4 is supplied to the second brake side pressure control valve 70 through the second port 474 (refer to FIG. 8).

Therefore, the valve spool of the pressure control valve 70, once moved to the right in the drawing by the control pressure from the third port 476, begins slowly moving to the left so as to communicate the fourth port 478 with the fifth port 480, and thereby the hydraulic pressure that is stationary at the fourth port 478 begins outputting through the fifth port 480 to be supplied to the second brake side fail-safe valve 74 through the second port 522.

Since the valve spool of the second brake side fail-safe valve 74 is moved to the left in the drawing by the line pressure fed through the first port 520, hydraulic pressure fed through the second port 522 is output through the third port 524 so as to be supplied to the second brake C2 as an operating pressure thereof. At the same time, the duty pressure of the fourth duty control solenoid valve DS4 is also supplied to the second brake side switch valve 68 through the first port 450, and accordingly, the valve spool of the switch valve 68 moves to the left in the drawing.

Therefore, the line pressure fed from the third port 454 is output through the fourth port 456 to be supplied to the second brake side pressure control valve 70 through the first port 472 and thereby forces the floating member 470 (and resultantly the valve spool) further to the left in the drawing. So, high operating pressure is supplied to the second brake B2 and shifting to a sixth speed D6 is finished. At this time, the control pressure of the fourth duty control solenoid valve DS4 is also supplied to the sixth-speed-related switch valve 72 through the second port 502. Since the operating pressure of the third clutch C3 is also supplied as control pressure to the sixth-speed-related switch valve 72 through the first port 500, the valve spool of the sixth-speed-related switch valve 72 moves to the right in the drawing.

Therefore, the hydraulic pressure supplied to the second port 502 is supplied to the second brake side pressure control valve 70 through the seventh port 484. Accordingly, the valve spool of the second brake side pressure control valve 70, which has been moved fully to the left in the drawing, is moved to the right. Therefore, an opening area of the fourth port 478 is reduced and thereby hydraulic pressure supplied to the second brake B2 is reduced.

In the reverse speed, the reverse speed pressure is supplied from the manual valve 40 directly to the first brake B1 through the reverse speed pressure line 82, and the third duty control solenoid valve DS3 is duty controlled. Therefore, the second clutch C2 receives a hydraulic pressure as described in connection with the third and fifth speeds D3 and D5, and the shifting to the reverse speed is thereby finished.

According to a hydraulic control system of the present invention applied to a powertrain of a six-speed automatic transmission having five friction members, at a beginning of a shifting, hydraulic pressure supplied to each friction member for each shift-speed receives is controlled by a pressure control valve, and therefore, control precision of the friction elements is enhanced.

Furthermore, regarding an operational element that is operated both at a low speed of D3 and a high speed D6, hydraulic pressure supplied to the operational element is reduced by a separate switch valve, and therefore, the operational element receives optimal required hydraulic pressure torque at both low and high speeds. Therefore, control precision of the operational element is enhanced and shift-shock is therefore minimized. In addition, drivability and fuel mileage of a vehicle is enhanced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control system of a six-speed automatic transmission for a vehicle comprising:

a line pressure control portion stably maintaining hydraulic pressure supplied from an oil pump and varying a line pressure according to driving conditions;

a launch control portion for controlling torque increase of a torque converter and for controlling a damper clutch;

a pressure reduction control portion for reducing line pressure and for outputting the reduced line pressure as control pressure;

a switch valve control portion comprising a manual valve for changing hydraulic lines according to a manual operation, a first switch valve controlled by the line pressure and a first on/off solenoid valve, a second switch valve controlled by the line pressure and a second on/off solenoid valve, and third and fourth switch valves being controlled by the line pressure and control pressure from the second switch valve;

a first clutch control portion comprising a first clutch side switch valve and a first clutch side pressure control valve that are controlled by a first duty control solenoid valve such that the first clutch control portion controls an operating pressure of the first clutch;

a B1/C3 control portion comprising a third clutch side switch valve and a third clutch side pressure control valve that are controlled by a second duty control solenoid valve, a control valve for switching hydraulic lines for hydraulic pressure supplied from the third clutch side pressure control valve, and a first brake side fail-safe valve for supplying hydraulic pressure received from the control valve to the first brake and for executing a fail-safe function;

a second clutch control portion comprising a second clutch side switch valve and a second clutch side pressure control valve that are controlled by a third duty control solenoid valve, and a second clutch side fail-safe valve for transmitting hydraulic pressure received from the second clutch side pressure control valve to the second clutch and for executing a fail-safe function;

a B2 control portion comprising a second brake side switch valve and a second brake side pressure control valve that are controlled by a fourth duty control solenoid valve, a sixth-speed-related switch valve for supplying, under the control of the operating pressure of the third clutch, hydraulic pressure received from the fourth duty control solenoid valve to the second brake side pressure control valve as a control pressure, and a second brake side fail-safe valve for transmitting hydraulic pressure received from the second brake side pressure control valve to the second brake and for executing a fail-safe function.

2. The hydraulic control system of claim 1, wherein the manual valve comprises:

a line pressure line connected to a regulator valve;

a reverse speed pressure line for supplying a reverse speed pressure in a reverse speed; and a forward speed pressure line for supplying a forward speed pressure in forward speeds.

3. The hydraulic control system of claim 1, wherein the first switch valve comprises a valve body and a valve spool, wherein the valve body of the first switch valve comprises:

a first port for receiving a control pressure from the first on/off solenoid valve;

a second port disposed opposite to the first port for receiving the line pressure as a control pressure;

a third port for receiving the line pressure; and fourth and fifth ports disposed with a predetermined spacing for supplying hydraulic pressure received through the first port selectively to two ports of the second switch valve, and the valve spool of the first switch valve comprises:

a first land for receiving a control pressure through the first port;

a second land for selectively communicating the fifth port with an exhaust port;

a third land cooperating with the second land for selectively communicating the third port with the fifth port cooperatively with the second land; and a fourth land for receiving a control pressure through the second port and for selectively communicating the third port with the fourth port cooperatively with the third land and for selectively communicating the fourth port with an exhaust port.

4. The hydraulic control system of claim 1, wherein the second switch valve comprises a valve body and a valve spool, wherein the valve body of the second switch valve comprises:

a first port for receiving a control pressure from the second on/off solenoid valve;

a second port disposed opposite to the first port for receiving the line pressure as a control pressure;

a third port for receiving hydraulic pressure from the fourth port of the first switch valve;

a fourth port for receiving hydraulic pressure from the fifth port of the first switch valve;

a fifth port for supplying hydraulic pressure of the third port to the control valve as a control pressure;

a sixth port for supplying hydraulic pressure of the third port to the third switch valve as a control pressure; and a seventh port for supplying hydraulic pressure of the fourth port to the fourth switch valve as a control pressure, and the valve spool of the second switch valve comprises:

a first land for receiving a control pressure through the first port;

a second land for selectively communicating the fifth port with an exhaust port;

a third land for selectively communicating the third port with the fifth and sixth ports and;

a fourth land cooperating with the third land for selectively communicating the sixth port with an exhaust port; and a fifth land cooperating with the fourth land for selectively communicating the fourth port with the seventh port.

5. The hydraulic control system of claim 1, wherein the third switch valve comprises a valve body and a valve spool, wherein the valve body of the third switch valve comprises:

a first port for receiving the line pressure as a control pressure;

a second port disposed opposite to the first port for receiving a control pressure from the second switch valve;

a third port disposed adjacent to the second port for receiving an operating pressure of the first clutch as a control pressure;

a fourth port disposed adjacent to the third port for receiving an operating pressure of the third clutch as a control pressure;

a fifth port for receiving the line pressure as a source pressure;

a sixth port for selectively supplying hydraulic pressure of the fifth port to the second clutch side pressure control valve; and a seventh port for exhausting hydraulic pressure that has been output through the sixth port, and the valve spool of the third switch valve comprises:

a first land for receiving a control pressure through the first port;

a second land for selectively communicating the sixth port with the seventh port;

a third land for selectively communicating the fifth port with the sixth port;

a fourth land for receiving a control pressure through the fourth port; and a fifth land for receiving a control pressure through the third port, wherein an elastic member is disposed to a side of the fifth land.

6. The hydraulic control system of claim 1, wherein the fourth switch valve comprises a valve body and a valve spool, wherein the valve body of the fourth switch valve comprises:

a first port for receiving the line pressure as a control pressure;

a second port disposed opposite to the first port for receiving a control pressure from the second switch valve;

a third port disposed adjacent to the second port for receiving an operating pressure of the first clutch as a control pressure;

a fourth port disposed adjacent to the third port for receiving an operating pressure of the third clutch as a control pressure;

a fifth port for receiving the line pressure as a source pressure;

a sixth port for selectively supplying hydraulic pressure of the fifth port to the second brake side pressure control valve; and a seventh port for exhausting hydraulic pressure that has been output through the sixth port, and the valve spool of the fourth switch valve comprises:

a first land for receiving a control pressure through the first port;

a second land for selectively communicating the sixth port with the seventh port;

a third land for selectively communicating the fifth port with the sixth port;

a fourth land for receiving a control pressure through the fourth port; and a fifth land for receiving a control pressure through the third port, wherein an elastic member is disposed to a side of the fifth land.

7. The hydraulic control system of claim 1, wherein the first clutch side switch valve comprises a valve body and a valve spool, wherein the valve body of the first clutch side switch valve comprises:

a first port for receiving a control pressure from the first duty control solenoid valve;

a second port disposed opposite to the first port for receiving the reduced pressure of the reducing valve as control pressure;

a third port for receiving the line pressure as a source pressure; and a fourth port for supplying hydraulic pressure of the third port to the first clutch side pressure control valve, and the valve spool of the first clutch side switch valve comprises:

a first land for receiving a control pressure through the first port; and a second land for receiving a control pressure through the second port and for selectively communicating the third port with the fourth port cooperatively with the first land, wherein an elastic member is disposed to a side of the first land.

8. The hydraulic control system of claim 1, wherein the first clutch side pressure control valve comprises a valve body, a valve spool disposed therein, and a cup for safely maintaining a moved position of the valve spool, wherein the valve body of the first clutch side pressure control valve comprises:

a first port for receiving a control pressure from the first clutch side switch valve;

a second port for receiving a control pressure from the first duty control solenoid valve;

a third port for receiving a reduced pressure of the reducing valve as a control pressure;

a fourth port for receiving a forward speed pressure from the manual valve;

a fifth port for supplying hydraulic pressure of the fourth port to the first clutch; and a sixth port for exhausting hydraulic pressure that has been output through the fifth port, and the valve spool of the first clutch side pressure control valve comprises a first land for receiving control pressure fed through the second port and for selectively opening the sixth port; and a second land for receiving a control pressure through the third port and for selectively communicating the fourth port with the fifth port cooperatively with the first land, wherein the valve spool is disposed in the valve body interposing an elastic member and the cup for receiving control pressure fed through the first port.

9. The hydraulic control system of claim 1, wherein the third clutch side switch valve comprises a valve body and a valve spool, wherein the valve body of the third clutch side switch valve comprises:

a first port for receiving a control pressure from the second duty control solenoid valve;

a second port disposed opposite to the first port for receiving the reduced pressure of the reducing valve as a control pressure;

a third port for receiving the line pressure as a source pressure; and a fourth port for supplying hydraulic pressure of the third port to the third clutch side pressure control valve, and the valve spool of the third clutch side switch valve comprises a first land for receiving a control pressure through the first port; and a second land for receiving a control pressure through the second port and for selectively communicating the third port with the fourth port cooperatively with the first land, wherein an elastic member is disposed to a side of the first land.

10. The hydraulic control system of claim 1, wherein the third clutch side pressure control valve comprises a valve body, a valve spool disposed therein, and a floating member for safely maintaining a moved position of the valve spool, wherein the valve body of the third clutch side pressure control valve comprises:

a first port for receiving a control pressure from the third clutch side switch valve;

a second port for receiving a control pressure from the second duty control solenoid valve;

a third port for receiving a reduced pressure of the reducing valve as a control pressure;

a fourth port for receiving a forward speed pressure from the manual valve;

a fifth port for supplying hydraulic pressure of the fourth port to the control valve; and a sixth port for exhausting hydraulic pressure that has been output through the fifth port, and the valve spool of the third clutch side pressure control valve comprises:

a first land for receiving control pressure fed through the second port and for selectively opening the sixth port;

a second land for receiving a control pressure through the third port and for selectively communicating the fourth port with the fifth port cooperatively with the first land; and a third land for receiving control pressure fed through the third port, wherein the valve spool is disposed in the valve body interposing an elastic member and the floating member for receiving control pressure fed through the first port.

11. The hydraulic control system of claim 1, wherein the control valve comprises a valve body and a valve spool, wherein the valve body of the control valve comprises:

a first port for receiving the line pressure as a control pressure;

a second port disposed opposite to the first port for receiving a control pressure from the second switch valve;

a third port for receiving an operating pressure of the first clutch as a control pressure;

a fourth port for receiving an operating pressure of the third clutch side pressure control valve;

a fifth port for selectively supplying hydraulic pressure fed through the fourth port to the third clutch;

a sixth port disposed between the first port and the fourth port for selectively exhausting hydraulic pressure that has been output through the fifth port;

a seventh port disposed between the third port and fifth port and connected to the first brake side switch valve; and an eighth port for exhausting hydraulic pressure that has been exhausted from the seventh port, and the valve spool of the control valve comprises:

a first land for receiving a control pressure through the first port and for selectively opening the sixth port;

a second land for selectively communicating the fourth port with the fifth port;

a third land for selectively communicating the seventh port with the eighth port;

a fourth land for receiving a control pressure through the third port; and a fifth land for receiving a control pressure through the second port.

12. The hydraulic control system of claim 1, wherein the first brake side fail-safe valve comprises a valve body and a valve spool, wherein the valve body of the first brake side fail-safe valve comprises:

a first port for receiving the line pressure as a control pressure;

a second port communicating with the seventh port of the control valve;

a third port for supplying hydraulic pressure fed through the second port to the first brake;

a fourth port for exhausting hydraulic pressure exhausted from the third port;

a fifth port for receiving operating pressure of the second brake as a control pressure;

a sixth port for receiving operating pressure of the second clutch as a control pressure;

a seventh port for receiving operating pressure of the first clutch as a control pressure; and an eighth port for receiving reverse speed pressure as a control pressure, and the valve spool of the first brake side fail-safe valve comprises:

a first land for receiving a control pressure through the first port;

a second land adjacent to the first land;

a third land for selectively communicating the third port with the second and fourth ports;

a fourth land for receiving control pressure though the fifth port, and cooperatively with the third land, for selectively communicating the third port with the fourth port;

a fifth land for receiving control pressure through the sixth port;

a sixth land for receiving control pressure through the seventh port; and a seventh land for receiving control pressure through the eighth port.

13. The hydraulic control system of claim 1, wherein the second clutch side switch valve comprises a valve body and a valve spool, wherein the valve body of the second clutch side switch valve comprises:

a first port for receiving a control pressure from the third duty control solenoid valve;

a second port disposed opposite to the first port for receiving the reduced pressure of the reducing valve as a control pressure;

a third port for receiving the line pressure as a source pressure; and a fourth port for supplying hydraulic pressure of the third port to the second clutch side pressure control valve, and the valve spool of the second clutch side switch valve comprises:

a first land for receiving a control pressure through the first port; and a second land for receiving a control pressure through the second port and for selectively communicating the third port with the fourth port cooperatively with the first land, wherein an elastic member is disposed to a side of the first land.

14. The hydraulic control system of claim 1, wherein the second clutch side pressure control valve comprises a valve body, a valve spool disposed therein, and a floating member for safely maintaining a moved position of the valve spool, wherein the valve body of the second clutch side pressure control valve comprises:

a first port for receiving a control pressure from the second clutch side switch valve;

a second port for receiving a control pressure from the third duty control solenoid valve;

a third port for receiving a reduced pressure of the reducing valve as a control pressure;

a fourth port for receiving a hydraulic pressure from the third switch valve;

a fifth port for supplying hydraulic pressure of the fourth port to the second clutch fail-safe valve; and a sixth port for exhausting hydraulic pressure that has been output through the fifth port, and the valve spool of the second clutch side pressure control valve comprises a first land for receiving control pressure fed through the second port and selectively opening the sixth port;

a second land for receiving a control pressure through the third port and for selectively communicating the fourth port with the fifth port cooperatively with the first land; and a third land for receiving control pressure fed through the third port, wherein the valve spool is disposed in the valve body interposing an elastic member and the floating member for receiving control pressure fed through the first port.

15. The hydraulic control system of claim 1, wherein the second clutch side fail-safe valve comprises a valve body and a valve spool, wherein the valve body of the second clutch side fail-safe valve comprises:

a first port for receiving the line pressure as a control pressure;

a second port communicating with the fifth port of the second clutch side pressure control valve;

a third port for supplying hydraulic pressure fed through the second port to the second clutch;

a fourth port for exhausting hydraulic pressure exhausted from the third port;

a fifth port for receiving operating pressure of the third clutch as a control pressure; and a sixth port for receiving operating pressure of the first clutch as a control pressure, and the valve spool of the second clutch side fail-safe valve comprises:

a first land for receiving a control pressure through the first port;

a second land adjacent to the first land;

a third land for selectively communicating the third port with the second and fourth ports and;

a fourth land for receiving control pressure though the fifth port, and cooperatively with the third land, for selectively communicating the third port with the fourth port;

a fifth land for receiving control pressure through the sixth port; and a sixth land for receiving control pressure through the sixth port together with the fifth land.

16. The hydraulic control system of claim 1, wherein the second brake side switch valve comprises a valve body and a valve spool, wherein the valve body of the second clutch side switch valve comprises:

a first port for receiving a control pressure from the fourth duty control solenoid valve;

a second port disposed opposite to the first port for receiving the reduced pressure of the reducing valve as a control pressure;

a third port for receiving the line pressure as a source pressure; and a fourth port for supplying hydraulic pressure of the third port to the second brake side pressure control valve, and the valve spool of the second brake side switch valve comprises:

a first land for receiving a control pressure through the first port; and a second land for receiving a control pressure through the second port and for selectively communicating the third port with the fourth port cooperatively with the first land, wherein an elastic member is disposed to a side of the first land.

17. The hydraulic control system of claim 1, wherein the second brake side control valve comprises a valve body, a valve spool disposed therein, and a floating member for safely maintaining a moved position of the valve spool, wherein the valve body of the second brake side pressure control valve comprises:

a first port for receiving a control pressure from the second brake side switch valve;

a second port for receiving a control pressure from the fourth duty control solenoid valve;

a third port for receiving a reduced pressure of the reducing valve as a control pressure;

a fourth port for receiving a hydraulic pressure from the fourth switch valve;

a fifth port for supplying hydraulic pressure of the fourth port to the second brake side fail-safe valve;

a sixth port for exhausting hydraulic pressure that has been output through the fifth port; and a seventh port for receiving control pressure from the sixth-speed-related switch valve, and the valve spool of the second brake side pressure control valve comprises:

a first land for receiving control pressure fed through the second port and for selectively opening the sixth port;

a second land for receiving a control pressure through the third port and for selectively communicating the fourth port with the fifth port cooperatively with the first land;

a third land for receiving control pressure fed through the third port; and a fourth land for receiving control pressure from the sixth-speed-related switch valve, wherein the valve spool is disposed in the valve body interposing an elastic member and the floating member for receiving control pressure fed through the first port.

18. The hydraulic control system of claim 1, wherein the sixth-speed-related switch valve comprises a valve body and a valve spool, wherein the valve body of the sixth-speed-related switch valve comprises:

a first port for receiving the operating pressure of the third clutch as a control pressure;

a second port for receiving a control pressure controlled by the fourth duty control solenoid valve; and a third port for supplying hydraulic pressure fed through the second port to the second brake side pressure control valve as a control pressure thereof, and the valve spool of the sixth-speed-related switch valve comprises a first land for receiving a control pressure through the first port; and a second land selectively communicating the second port with the third port, wherein an elastic member is disposed to a side of the second land.

19. The hydraulic control system of claim 1, wherein the second brake side fail-safe valve comprises a valve body and a valve spool, wherein the valve body of the second brake side fail-safe valve comprises:

a first port for receiving the line pressure as a control pressure;

a second port communicating with the fifth port of the second brake side pressure control valve;

a third port for supplying hydraulic pressure fed through the second port to the second brake;

a fourth port for exhausting hydraulic pressure exhausted from the third port;

a fifth port for receiving operating pressure of the second brake as a control pressure;

a sixth port for receiving operating pressure of the third clutch as a control pressure;

a seventh port for receiving operating pressure of the first clutch as a control pressure; and an eighth port for receiving operating pressure of the first brake as a control pressure, and the valve spool of the second brake side fail-safe valve comprises:

a first land for receiving a control pressure through the first port;

a second land adjacent to the first land;

a third land for selectively communicating the third port with the second and fourth ports;

a fourth land for receiving control pressure though the fifth port and selectively communicating the third port with the fourth port cooperatively with the third land;

a fifth land for receiving control pressure through the sixth port;

a sixth land for receiving control pressure through the seventh port; and a seventh land for receiving control pressure through the eighth port.

* * * * *